United States Patent
He et al.

(10) Patent No.: US 10,937,158 B1
(45) Date of Patent: Mar. 2, 2021

(54) MEDICAL IMAGE SEGMENTATION BASED ON MIXED CONTEXT CNN MODEL

(71) Applicant: Hong Kong Applied Science and Technology Research Institute Company Limited, Hong Kong (CN)

(72) Inventors: Xuejian He, Hong Kong (CN); Lu Wang, Hong Kong (CN); Xiaohua Wu, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 93 days.

(21) Appl. No.: 16/538,923

(22) Filed: Aug. 13, 2019

(51) Int. Cl.
*G06K 9/00* (2006.01)
*G06T 7/00* (2017.01)
(Continued)

(52) U.S. Cl.
CPC .............. *G06T 7/0012* (2013.01); *G06N 3/04* (2013.01); *G06T 7/11* (2017.01);
(Continued)

(58) Field of Classification Search
CPC ..................... G06T 7/0012; G06T 7/11; G06T 2207/10088; G06T 2207/20081; G06T 2207/20084; G06N 3/04
See application file for complete search history.

(56) References Cited

U.S. PATENT DOCUMENTS 10,878,576 B2 * 12/2020 Han ......................... G06N 3/08

2014/0314289 A1 * 10/2014 Spottiswoode ....... G06T 7/0012
382/128
(Continued)

FOREIGN PATENT DOCUMENTS

| CN | 107220980 A | 9/2017 |
|---|---|---|
| CN | 108492297 A | 9/2018 |

(Continued)

OTHER PUBLICATIONS

Q. Dou et al., "Automatic Detection of Cerebral Microbleeds from MR Images via 3D Convolutional Neural Networks," IEEE Transactions on Medical Imaging, vol. 35, pp. 1182-1195, May 2016.
(Continued)

*Primary Examiner* — Xin Jia
(74) *Attorney, Agent, or Firm* — Spruson & Ferguson (Hong Kong) Limited

(57) ABSTRACT

An image volume formed by plural anatomical images each having plural image slices of different imaging modalities is segmented by a 2D convolutional neural network (CNN). An individual anatomical image is preprocessed to form a mixed-context image by incorporating selected image slices from two adjacent anatomical images without any estimated image slice. The 2D CNN utilizes side information on multi-modal context and 3D spatial context to enhance segmentation accuracy while avoiding segmentation performance degradation due to artifacts in the estimated image slice. The 2D CNN is realized by a BASKET-NET model having plural levels from a highest level to a lowest level. The number of channels in most multi-channel feature maps of a level decreases monotonically from the highest level to the lowest level, allowing the highest level to be rich in low-level feature details for assisting finer segmentation of the individual anatomical image.

20 Claims, 11 Drawing Sheets

(51) Int. Cl.
*G06T 7/11* (2017.01)
*G06N 3/04* (2006.01)

(52) U.S. Cl.
CPC .............. *G06T 2207/10088* (2013.01); *G06T 2207/20081* (2013.01); *G06T 2207/20084* (2013.01)

(56) References Cited

U.S. PATENT DOCUMENTS

| | | | | |
|---|---|---|---|---|
| 2018/0240235 A1* | 8/2018 | Mazo | ................... | G06N 3/0454 |
| 2019/0030371 A1* | 1/2019 | Han | ....................... | G16H 50/20 |
| 2019/0251694 A1* | 8/2019 | Han | ....................... | G06T 7/174 |

FOREIGN PATENT DOCUMENTS

| | | |
|---|---|---|
| CN | 108537793 A | 9/2018 |
| CN | 109087318 A | 12/2018 |
| CN | 109685819 A | 4/2019 |
| CN | 109978850 A | 7/2019 |
| WO | 2017091833 A1 | 6/2017 |

OTHER PUBLICATIONS

O. Ronneberger, P. Fischer and T. Brox, (2015) "U-Net: Convolutional Networks for Biomedical Image Segmentation," in: Navab N., Homegger J., Wells W., Frangi A. (eds) Medical Image Computing and Computer-Assisted Intervention—MICCAI 2015, Lecture Notes in Computer Science, vol. 9351, Springer.
International Search Report and Written Opinion of PCT application No. PCT/CN2019/102550 issued from the International Search Authority dated May 12, 2020.
Yu et al.; Thickened 2D Networks for Efficient 3D Medical Image Segmentation; Apr 2, 2019 https://arxiv.org/abs/1904.01150.
Gu et al.; CE-Net: Context Encoder Network for 2D Medical Image Segmentation; Mar 7, 2019 https://arxiv.org/abs/1903.02740.

* cited by examiner

MEDICAL IMAGE SEGMENTATION BASED ON MIXED CONTEXT CNN MODEL

LIST OF ABBREVIATIONS

2D Two-dimensional
3D Three-dimensional
BN Batch normalization
CNN Convolutional neural network
CT Computed tomography
DSC Dice similarity coefficient
ELU Exponential linear unit
FCN Fully convolutional neural network
FLAIR Fluid-attenuated inversion recovery
IR Inversion recovery
MRI Magnetic resonance imaging
PET Positron emission tomography

FIELD OF THE INVENTION

The present invention generally relates to automatic image segmentation by using a CNN. In particular, the present invention relates to using a 2D CNN to segment an image volume obtained by imaging a body part of a subject under different imaging modalities in a medical application.

BACKGROUND

Consider MRI as an example for illustrating the technical problem under consideration for general medical imaging.

MRI is widely used in medical applications for non-invasively imaging a body part of a subject. One important medical application of MRI is to image a human brain for medical diagnosis such as detecting possible tumors in the brain and characterizing Alzheimer's disease. Segmentation of MRI images into different classes or regions, such as regions of gray matter and of white matter in the brain, is most often required in analyzing the obtained MRI images. In imaging the brain, an image volume, which is a plurality of anatomical images obtained at different locations in the brain, is usually generated. Furthermore, a brain material may respond differently to different MRI sequences in exciting the brain in MRI such that contrast among different brain materials is enhanced by exciting the brain with different MRI sequences. The brain may be imaged under different MRI modalities, i.e. with different MRI sequences, to more-accurately distinguish different regions of the brain. A resultant MRI image is a multi-channel image having plural image slices (which can be called MRI slices). A need to segment multi-channel MRI images is usually encountered in practice.

Deep learning-based segmentation methods, mostly based on using CNNs, have been shown to significantly outperform traditional automatic segmentation methods, such as histogram-based methods, as well as to avoid a need for large domain-knowledge databases as commonly required in the traditional methods. Since an image volume is segmented, a 3D CNN has been shown to achieve a higher accuracy in segmentation than a 2D CNN. See, e.g., Q. DOU et al., "Automatic Detection of Cerebral Microbleeds from MR Images via 3D Convolutional Neural Networks," *IEEE Transactions on Medical Imaging*, vol. 35, pp. 1182-1195, May 2016, the disclosure of which is incorporated by reference herein in its entirely.

However, MRI image volume segmentation by the 3D CNN encounters a technical problem. The segmentation performance of the 3D CNN degrades considerably if successive body-part locations that are imaged are spaced too far away, e.g., 6 mm. A distance between adjacent body-part locations is called a slice gap. Using a longer slice gap for brain imaging is sometimes unavoidable in clinical practice due to, e.g., the need to image a large number of patients in a short time, or the need to avoid image blurring by shortening the time of immobilizing the imaged patient.

For demonstration, FIG. 10 plots performance curves in terms of DSC versus different slice gaps in segmenting an image volume of a brain into gray matter (curve 1010), white matter (curve 1020) and cerebrospinal fluid (curve 1030) by using a 3D CNN. The 3D CNN was realized as VoxResNet, and was trained and tested on IBSR dataset. The slice gap of images in IBSR dataset is 1.5 mm. The 3D CNN was subsequently used to segment image volumes in the MRBrainS dataset with a slice gap of 3 mm. It is apparent that the segmentation performance drop is significant, especially in identifying cerebrospinal fluid in the brain. There is also segmentation performance drop in identifying gray matter and white matter. A third-party database having a slice gap of 6 mm was also tested. A more significant performance drop is observed. In particular, the DSC drops to 0.3, indicating that the segmentation performance is poor.

It is desirable to develop a CNN-based segmentation technique that addresses the aforementioned problem of segmentation performance degradation. The developed technique is useful for segmenting brain image volumes, and is potentially useful for segmenting MRI image volumes that image other body parts, such as hearts, livers, etc.

The aforementioned problem is also encountered in imaging with general imaging modalities not limited to MRI modalities. These imaging modalities include, e.g., CT scanning, PET scanning and 3D ultrasound imaging. Performance of segmenting a general image volume, formed by a plurality of anatomical images each being a multi-channel image having image slices imaged under different imaging modalities, by a 3D CNN degrades considerably if the slice gap is large. The developed technique is also useful for segmenting the general image volume.

In addition, it is desirable if the technique can also improve segmentation performance over conventional techniques in cases that the slice gap is small.

SUMMARY OF THE INVENTION

Herein, it is provided with a computer-implemented method for segmenting an image volume formed by a plurality of anatomical images imaged at a sequence of successive locations of a body part. An individual anatomical image is a multi-channel image comprising a plurality of imaging slices imaged at a same location under a plurality of preselected MRI modalities.

A first aspect of the present disclosure is to provide a technique of preprocessing the plurality of anatomical images in the disclosed image-volume segmenting method.

The method comprises generating a plurality of mixed-context images from the plurality of anatomical images. An individual mixed-context image generated for a considered location in the location sequence other than two terminal locations thereof is a multi-channel image comprising the plurality of imaging slices of a corresponding anatomical image imaged at the considered location, a first set of one or more imaging slices imaged at a first location, and a second set of one or more imaging slices imaged at a second location. The first and second locations are immediately before and immediately after the considered location in the location sequence, respectively, avoiding the individual mixed-context image from including any imaging slice estimated for an intermediate location between the first and considered locations or between the second and considered locations. The method further comprises processing the plurality of mixed-context images individually with a 2D CNN after the 2D CNN is trained. The individual mixed-context image is processed by the 2D CNN to segment the corresponding anatomical image, enabling the 2D CNN to utilize side information on multi-modal context and 3D spatial context of the image volume for enhancing accuracy in segmenting the corresponding anatomical image while avoiding a source of segmentation performance degradation due to artifacts in the estimated image slice. In the method, all the different images in the plurality of mixed-context images are segmented accordingly, whereby the image volume is segmented.

Preferably, each of the first and second image-slice sets has the same number of image slices and is imaged under the same set of imaging modalities selected from the plurality of preselected imaging modalities. In one option, said same number of image slices is a total number of image slices in the corresponding anatomical image such that each of the first and second image-slice sets is imaged under the plurality of preselected imaging modalities. That is, the first image-slice set is the plurality of image slices in a first adjacent anatomical image imaged at the first location, and the second image-slice set is the plurality of image slices in a second adjacent anatomical image imaged at the second location. In another option, said same number of image slices is less than a total number of image slices in the corresponding anatomical image. That is, the first image-slice set is a first proper subset of the plurality of image slices in the first adjacent anatomical image, and the second image-slice set is a second proper subset of the plurality of image slices in the second adjacent anatomical image. In yet another option, said same number of image slices is one.

The body part may be a head of a subject. The corresponding anatomical image is segmented into a plurality of classes. The plurality of classes may consist of background, gray matter, white matter and cerebrospinal fluid.

The plurality of preselected imaging modalities may consist of MRI modalities including T1 MRI modality, IR MRI modality and FLAIR MRI modality.

Note that the processing of the plurality of mixed-context images individually with the 2D CNN after the 2D CNN is trained includes processing the individual mixed-context image with the 2D CNN for segmenting the corresponding anatomical image. The processing of the individual mixed-context image with the 2D CNN may comprise: gridding the individual mixed-context image to form plural multi-channel patches; and processing each of the multi-channel patches as the received input image by the 2D CNN so as to obtain the segmented corresponding anatomical image.

A second aspect of the present disclosure is to provide a novel CNN model usable to realize the 2D CNN that is used in the disclosed image-volume segmenting method. The provided CNN model is named as BASKET-NET.

The 2D CNN realized by the BASKET-NET model is used for generating an output segmentation map from a received input image via generating plural feature maps in between. Each of the received input image, the output segmentation map and the feature maps is a multi-channel map having plural channels. The 2D CNN comprises a plurality of levels sequentially arranged from a highest level to a lowest level. The 2D CNN is configured such that the following four conditions are satisfied. First, an individual level generates an output map from an input map, where the input map of the individual level is transformed into the output map thereof through generating a series of feature maps in between. Second, the input map of the highest level is the received input image and the output map of the highest level is the output segmentation map. Third, for a next lower level immediately lower than the individual level, the input map of the next lower level is obtained by downsampling a first preselected feature map of the individual level. Fourth, the output map of the next lower level is upsampled and then concatenated with a second preselected feature map of the individual level to generate a next feature map next to the second preselected feature map in the individual level. Advantageously, a first number of channels in the second preselected feature map of the individual level is greater than or equal to a second number of channels in the second preselected feature map of the next lower level such that more feature details are containable in the individual level than in the next lower level, thereby allowing the second preselected feature map of the highest level to be rich in low-level feature details for assisting finer segmentation of the received input image in generating the output segmentation map.

Preferably, the 2D CNN is further configured such that in the individual level, an individual feature map other than the second preselected feature map is processed with one or more hidden layers to generate a subsequent feature map. The one or more hidden layers include a convolutional layer. In certain embodiments, the one or more hidden layers consist of the convolutional layer, an ELU layer, a dropout layer and a BN layer.

It is also preferable that the 2D CNN is further configured such that in the individual level, one or more hidden layers are used to generate the second preselected feature map from the first preselected feature map.

The 2D CNN is usable to the disclosed image-volume segmenting method with or without using the above-mentioned technique of preprocessing the plurality of anatomical images.

In case the above-mentioned preprocessing technique is used, the received input image is a part of the individual mixed-context image, and the output segmentation map is a part of the segmented corresponding anatomical image corresponding to the part of the mixed-context image.

In case the above-mentioned preprocessing technique is not used, an individual anatomical image is segmented with the 2D CNN to form a segmented individual anatomical image after the 2D CNN is trained. The segmenting of the individual anatomical image with the 2D CNN is repeated for all different anatomical images in the plurality of anatomical images, whereby the image volume is segmented. For the 2D CNN, the received input image is a part of the individual anatomical image, and the output segmentation map is a part of the segmented individual anatomical image corresponding to the part of the individual anatomical image.

In case the above-mentioned preprocessing technique is not used, the segmenting of the individual anatomical image with the 2D CNN may further comprise: gridding the individual anatomical image to form plural multi-channel patches; and processing each of the multi-channel patches as the received input image by the 2D CNN so as to obtain the segmented individual anatomical image.

A third aspect of the present disclosure is to provide a technique of gridding the individual mixed-context image or an individual anatomical image for further improving the performance of segmenting the image volume.

In case the above-mentioned preprocessing technique is used, the processing of the plurality of mixed-context images individually with the 2D CNN after the 2D CNN is trained includes processing the individual mixed-context image with the 2D CNN for segmenting the corresponding anatomical image. The processing of the individual mixed-context image with the 2D CNN comprises: selecting plural grids each used for gridding the individual mixed-context image, wherein the grids are geometrically offset from each other; for a candidate grid selected from the grids, gridding the individual mixed-context image according to the candidate grid to form plural multi-channel patches; processing each of the multi-channel patches as the received input image by the 2D CNN so as to obtain a candidate segmented image for the corresponding anatomical image; repeating the gridding of the individual mixed-context image and the processing of each of the multi-channel patches for all the grids, whereby a plurality of candidate segmented images is obtained; and forming the segmented corresponding anatomical image from the plurality of candidate segmented images according to pixel-wise majority voting.

In case the above-mentioned preprocessing technique is not used, the segmenting of the individual anatomical image with the 2D CNN comprises: selecting plural grids each used for gridding the individual anatomical image, wherein the grids are geometrically offset from each other; for a candidate grid selected from the grids, gridding the individual anatomical image according to the candidate grid to form plural multi-channel patches; processing each of the multi-channel patches as the received input image by the 2D CNN so as to obtain a candidate segmented image for the individual anatomical image; repeating the gridding of the individual anatomical image and the processing of each of the multi-channel patches for all the grids, whereby a plurality of candidate segmented images is obtained; and forming the segmented individual anatomical image from the plurality of candidate segmented images according to pixel-wise majority voting.

Herein, it is additionally provided with a computer-implemented method for retraining a 2D CNN used in a computer-executed inference process. The 2D CNN has a set of CNN model weights. The inference process is used for segmenting an image volume formed by a plurality of anatomical images imaged at a sequence of successive locations of a body part. An individual anatomical image is a multi-channel image comprising a plurality of image slices imaged at a same location under a plurality of preselected imaging modalities.

In the method, the inference process is executed one or more times for segmenting one or more respective image volumes to create one or more first pluralities of labeled anatomical images. (Equivalently, each labeled anatomical image may be formed as an original anatomical image with labels for locating different classes identified on the original anatomical image.) The inference process is arranged according to any of the embodiments of the disclosed image-volume segmenting method. An individual labeled anatomical image is created from the corresponding anatomical image after segmentation for identifying different classes or regions in the corresponding anatomical image.

In an individual first plurality of labeled anatomical images, one or more labeled anatomical images are replaced with the same number of one or more relabeled anatomical images having corrected segmentation over corresponding one or more labeled anatomical images, so that the individual first plurality of labeled anatomical images is replaced by a second plurality of labeled anatomical images. Thereby, one or more respective second pluralities of labeled anatomical images are generated from the one or more first pluralities of labeled anatomical images.

The 2D CNN is further trained with the one or more respective second pluralities of labeled anatomical images to update the set of CNN model weights from an immediately previous set of CNN model weights.

The updated set of CNN model is validated by repeating the inference process for segmenting a plurality of test image volumes of a validation dataset under a condition that the 2D CNN employs the updated set of CNN model weights. A validation loss that is obtained by using the updated set of CNN model weights in the 2D CNN is computed. The validation loss indicates a degree of overall segmentation loss in segmenting the plurality of test image volumes of the validation dataset.

Responsive to finding that the validation loss obtained by the updated set of CNN model is less than a corresponding validation loss obtained by the immediately previous set of CNN weights, the updated set of CNN model weights is adopted to be used for the inference process. Otherwise the 2D CNN is restored with the immediately previous set of CNN model weights.

Other aspects of the present disclosure are disclosed as illustrated by the embodiments hereinafter.

DETAILED DESCRIPTION

Figure 1A:
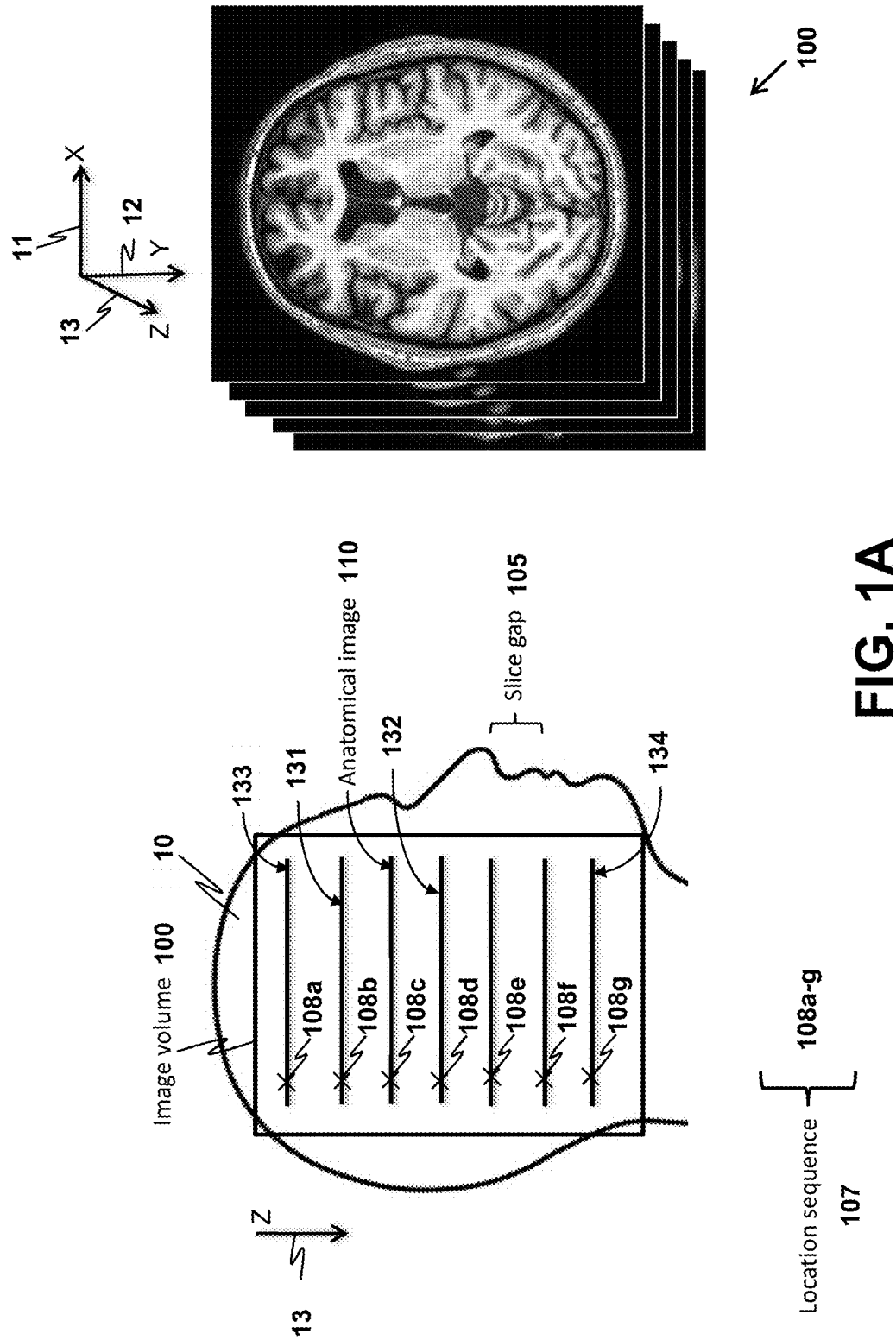
FIG. 1A depicts an image volume obtained by using MRI to image a human head.

The following definitions are used herein in the specification and appended claims. "A subject" means an animal or a human being unless otherwise specified. "A CNN" means a neural network having plural hidden layers at least some of which are convolutional layers, where each convolutional layer is used to perform a convolution or dot product with an input provided to the layer. "A 2D CNN" means a CNN whose individual convolutional layer is adapted to perform a 2D convolution with a 2D input. "A 3D CNN" means a CNN whose individual convolutional layer is adapted to perform a 3D convolution with a 3D input. "A MRI modality" means a scheme of exciting a body part of a subject in carrying out MRI to image the body part. The scheme is realized by using a MRI sequence, which is a particular setting of RF pulses and gradients for resulting in an image with a particular appearance, e.g., by enhancing the contrast of the image. Details of MRI sequences may be found, e.g., in G. WIDMANN, B. HENNINGER, C. KREMSER and W. JASCHKE, "MRI Sequences in Head & Neck Radiology—State of the Art," *Fortschr Röntgenstr* (2017), vol. 189, pp. 413-422, and in A. PATEL, C. SILVERBERG, D. BECKER-WEIDMAN, C. ROTH and S. DESHMUKH, "Understanding Body MRI Sequences and Their Ability to Characterize Tissues," *Universal Journal of Medical Science*, vol. 4, issue 1, pp. 1-9, 2016, the disclosures of both of which are incorporated by reference herein. "An imaging modality" means one form of imaging that enables 3D scanning of a body part. For example, an imaging modality may be CT scanning, PET scanning, 3D ultrasound scanning, MRI scanning under one MRI modality, etc.

The present disclosure is concerned with embodiments for segmenting image volumes. Each image volume has anatomical multi-channel images obtained by imaging a body part of a subject. Each multi-channel image includes plural image slices imaged under different imaging modalities. For example, when MRI is used, the image slices of each multi-channel image are MRI slices imaged under different MRI modalities. In another example, when CT and PET are simultaneously used to scan the body part as in PET-CT scanning, each multi-channel image includes one image slice obtained from CT scanning, and another image slice obtained from PET scanning. Apart from PET-CT scanning, PET-MRI is another hybrid imaging technology that is in clinical use. In yet another example, image slices of each multi-channel image include one image slice obtained from PET scanning, and plural MRI slices imaged under different MRI modalities. Contrast CT is commonly used in clinical practice. CT images are taken both with and without radiocontrast. In a further example, image slices of each multi-channel image include a precontrast CT image slice and a postcontrast CT image slice. In targeted contrast-enhanced ultrasound imaging, microbubble contrast agents injected to a selected organ in the body part are used to enhance contrast in imaging the selected organ. In an additional example, image slices of each multi-channel image include image slices obtained from ultrasound imaging with and without microbubble contrast agents. Despite many examples are given, these examples are non-limiting and are not exhaustive.

Exemplarily, the embodiments for segmenting image volumes are explained, described and illustrated hereinafter by specifically considering MRI image volumes, in which each anatomical multi-channel image includes MRI slices imaged under different MRI modalities. Those skilled in the art will appreciate that the embodiments for segmenting general image volumes can be derived in a straightforward manner by generalizing the teaching disclosed hereinafter for segmenting MRI image volumes.

The following four features are employed herein in the development of the embodiments.

Using a 2D CNN to segment an individual image volume instead of using a 3D CNN for reducing computation requirements. Prior to being processed by the 2D CNN, each anatomical multi-channel image is preprocessed with a preprocessing algorithm to incorporate side information provided by the multi-modal context and the 3D spatial context inherent in the individual image volume, yielding a mixed-context image. Although the 2D CNN is used to segment the mixed-context image, the side information enhances the segmentation performance without using the 3D CNN. Furthermore, the mixed-context image does not include any MRI slice that is estimated. Artifacts in the estimated MRI slice are a source of segmentation performance degradation. The mixed-context image includes MRI slices originally obtained from the individual image volume only.

A novel CNN model, named as BASKET-NET, is used to realize the 2D CNN. The CNN model is advantageously configured to retain more low-level features than high-level ones for assisting finer segmentation of a received input image in generating an output segmentation map.

Multiple grids are separately used to grid each anatomical image to yield different pluralities of 3D patches. Each plurality of 2D patches is processed by the 2D CNN to yield one segmented image. From resultant plural segmented images, pixel-wise majority voting is used to generate a final segmented image.

In case some segmented images in a segmented image volume are found to be incorrectly segmented, these segmented images are manually corrected. The corrected images replace the original segmented images (viz., labeled images) in the segmented image volume to form a relabeled image volume. The relabeled image volume is used to retrain the 2D CNN by updating the CNN model weights from existing ones. This retraining method is a semi-automatic one. It improves segmentation performance in segmenting subsequent image volumes while avoiding a traditional approach of manually rebuilding a training dataset and determining a completely new set of CNN model weights based on the rebuilt training dataset.

Herein, the present disclosure is explained by considering an exemplary application in neuroimaging. Despite this, the present disclosure is not limited only to applications in imaging brains; the present disclosure is usable for segmenting anatomical images obtained from imaging other body parts of a subject, such as hearts, livers, chests, abdomens, muscles, etc.

FIG. 1A depicts an image volume 100 obtained by imaging a human head 10. The image volume 100 is formed by a plurality of anatomical images imaged by the MRI technique. Without ambiguity, the plurality of anatomical images is also referenced by numeral 100. The plurality of anatomical images 100 is individually imaged at a sequence 107 of successive locations 108a-g of the human head 10. That is, the head 10 is imaged successively at the locations 108a-g to form the plurality of anatomical images 100. Although seven locations 108a-g are depicted in FIG. 1A for illustration purposes, it is not intended that any image volume considered in the present disclosure is limited only to this number of locations or this number of anatomical images. The body-part locations 108a-g that are imaged are distributed, most often evenly, along a reference direction, viz., a direction along the z-axis 13 (or the z-direction 13 in short)

as shown in FIG. 1A. A distance between two successive body-part locations (e.g., the locations 108e and 108f) is a slice gap 105.

An anatomical image 110 is used hereinafter for illustrating an exemplary anatomical image of the image volume 100. The anatomical image 110 shows a cross section of the human head 10 imaged at a considered location 108c on the z-axis 13. The location sequence 107 is an ordered sequence and has successive locations sequentially arranged along the z-direction 13, or along a direction opposite thereto. Without loss of generality, consider the location sequence 107 given by locations 108a, 108b, 108c, . . . , 108g. The locations 108a, 108g are two terminal locations located at two ends of the location sequence 107. A first location 108b is immediately before the considered location 108c in the location sequence 107. Similarly, a second location 108d is immediately after the considered location 108c in the location sequence 107. The anatomical image 110 has two adjacent anatomical images 131, 132 imaged at the first and second locations 108b, 108d, respectively.

Figure 1B:
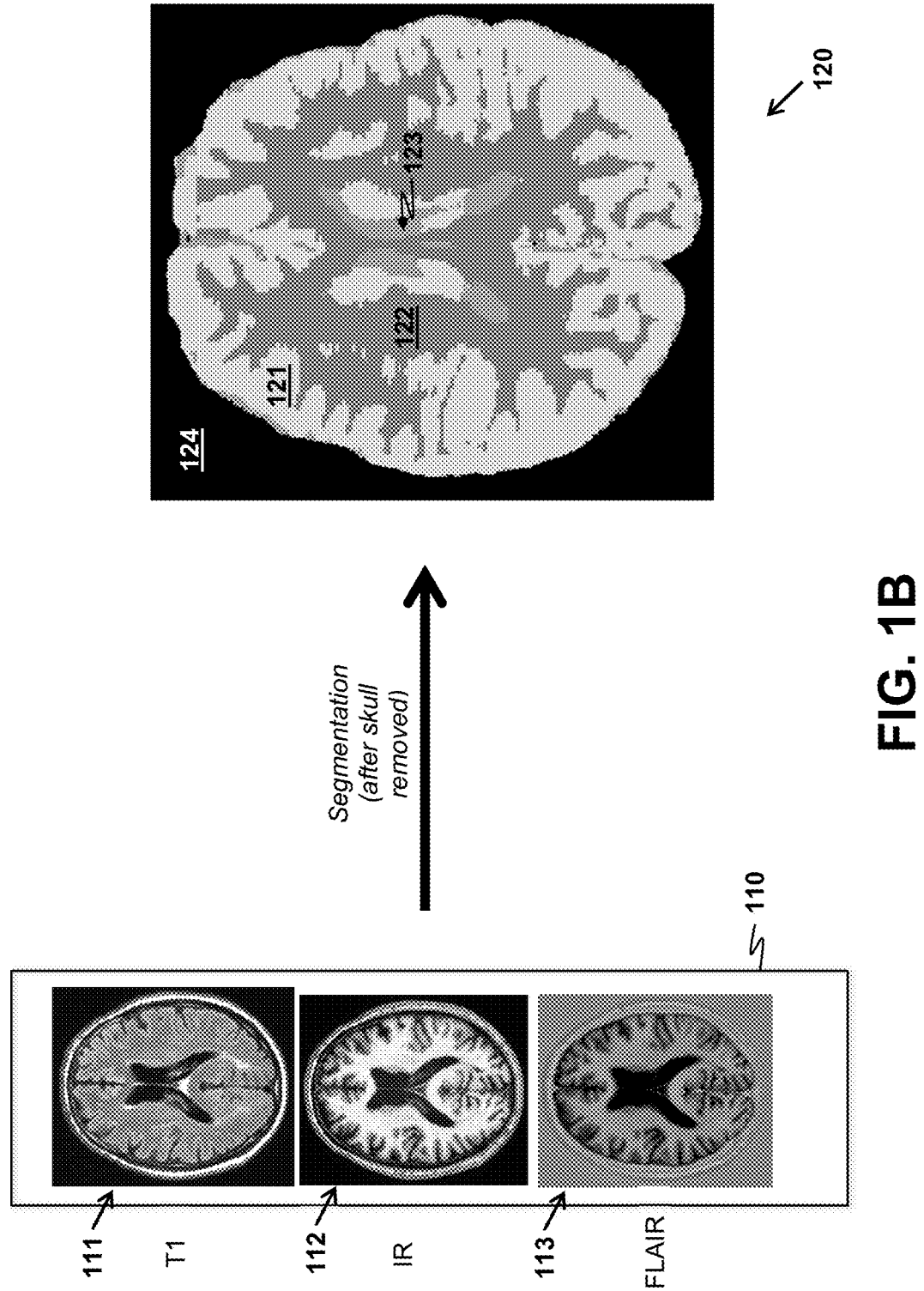
FIG. 1B depicts an exemplary anatomical image that is segmented into different regions or classes.

FIG. 1B depicts the anatomical image 110 being segmented into different classes or regions 121-124 as shown in a segmented anatomical image 120. The anatomical image 110 is a multi-channel image including a plurality of channels for storing a plurality of MRI slices 111-113 imaged at the same location (i.e. the considered location 108c) under a plurality of preselected MRI modalities. In one practical choice as shown in FIG. 1B, the plurality of preselected MRI modalities consists of T1 MRI modality, IR MRI modality and FLAIR MRI modality. The MRI slices 111, 112, 113 show MRI images obtained under the T1 MRI modality, the IR MRI modality and the FLAIR MRI modality, respectively. Using these MRI modalities in obtaining the anatomical image 110 enhances contrast in segmenting the brain into gray matter, white matter and cerebrospinal fluid. The preselected MRI modalities are determined by the MRI sequences used in imaging. In general, selection of appropriate MRI sequences depends on a body part to be imaged and types of body materials to be identified. Summaries of MRI sequences and body materials particularly responsive to respective MRI sequences are available in the art, e.g., in the disclosures of G. WIDMANN et al. and of PATEL et al. as mentioned above.

Before segmenting the anatomical image 110, images of the skull in the MRI slices 111-113 are first removed as the skull is uninformative in segmenting the anatomical image 110. Techniques for skull stripping are known in the art, e.g., in P. KALAVATHI and V. B. S. PRASATH, "Methods on Skull Stripping of MRI Head Scan Images—a Review", *Journal of Digital Imaging* (2016) 29:365-379, the disclosure of which is incorporated by reference herein. The MRI slices 111-113 after skull removal are collectively used for segmenting the anatomical image 110, resulting in the segmented anatomical image 120. Three regions 121-123 on the brain locate the gray matter, the white matter and the cerebrospinal fluid. Outside the brain is the background 124.

Figure 2:
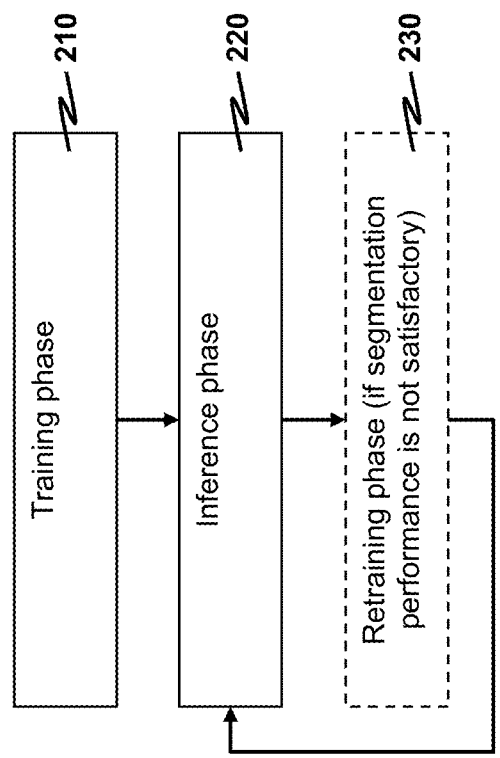
FIG. 2 depicts a flow diagram for illustrating different phases of using a 2D CNN in segmenting MRI image volumes in accordance with certain embodiments of the present disclosure.

In the present disclosure, a 2D CNN is used for image volume segmentation. The 2D CNN is characterized by a network model structure and a set of CNN model weights applied to the network model structure. FIG. 2 depicts a flow diagram of operating the 2D CNN for segmenting MRI image volumes in accordance with certain embodiments of the present disclosure. A training phase 210 is first initiated. In the training phase 210, the 2D CNN is trained with a plurality of labeled image volumes that are already segmented. The set of CNN model weights is determined as a result of training. The determined set of CNN model weights is used in the 2D CNN for carrying out an inference phase 220. In the inference phase 220, different image volumes are segmented by the trained 2D CNN. In case some segmented image volumes that are obtained in the inference phase 220 are found incorrect in segmentation, a retraining phase 230 is initiated and the 2D CNN is retrained to obtain a new set of CNN model weights. The retrained 2D CNN is used thereafter for image volume segmentation.

Disclosed herein is a computer-implemented method for segmenting an image volume formed by a plurality of anatomical images. The plurality of anatomical images is imaged at a sequence of successive locations of a body part. An individual anatomical image is a multi-channel image comprising a plurality of image slices imaged at a same location under a plurality of preselected imaging modalities. Also disclosed herein is a computer-implemented method for retraining the 2D CNN.

The specific case of segmenting MRI image volumes is used to exemplarily illustrate the two disclosed methods. As such, the plurality of image slices becomes a plurality of MRI slices, and the plurality of preselected imaging modalities becomes a plurality of preselected MRI modalities. Those skilled in the art will be able to derive details of the two disclosed methods for processing general image volumes by directly extending the details addressed for MRI slices imaged under different MRI modalities to applying for general image slices imaged under different imaging modalities.

A first aspect of the present disclosure is to provide a technique of preprocessing the plurality of anatomical images in the disclosed image-volume segmenting method.

Figure 3:
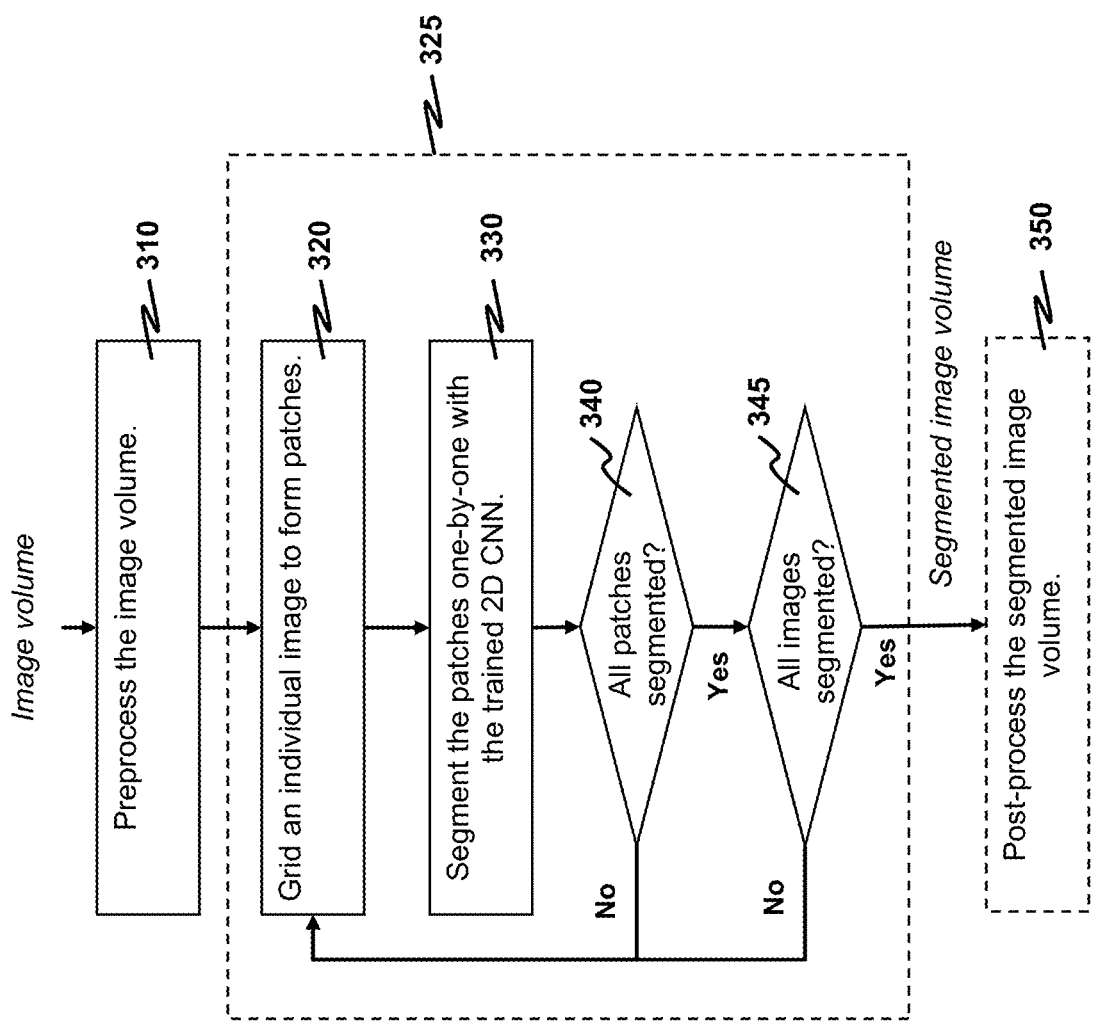
FIG. 3 depicts a flowchart showing exemplary steps of an image-volume segmenting method in accordance with certain embodiments of the present disclosure.

FIG. 3 depicts a flowchart showing exemplary steps of the image-volume segmenting method that employs the disclosed preprocessing technique in accordance with certain embodiments of the present disclosure. Particularly, the flowchart of FIG. 3 depicts one realization of the inference phase 220. Those skilled in the art will appreciate that details of the training phase 210 can be derived according to the teaching disclosed herein on the inference phase 220 and the body of knowledge in the art related to estimating a set of CNN model weights from training data (e.g., using a back-propagation training algorithm for such estimation).

In a step 310, the plurality of anatomical images is processed by a preprocessing algorithm to generate a plurality of mixed-context images for incorporating side information on multi-modal context and 3D spatial context of the image volume.

Before details of the step 310 are described, it is instructive to mention that the segmentation performance degradation of using a 3D CNN to segment an image volume having a large slice gap is potentially caused by artifacts generated in estimating MRI slices for locations not in the location sequence 107. In segmenting an image volume having a large slice gap, a MRI slice estimated for an intermediate location between two adjacent body-part locations is usually used as an input to the 3D CNN because the slice gap of the image volume does not match a corresponding slice gap of a training image volume used in training the 3D CNN. The estimated MRI slice is a computed one obtained by interpolating original MRI slices imaged at body-part locations in the location sequence 107. Artifacts are usually incorporated into the estimated MRI slice, forming a source of segmentation performance degradation. It is therefore desirable and advantageous not to include the estimated MRI slice in the generation of the plurality of the mixed-context images.

In the preprocessing algorithm for generating the plurality of mixed-context images from the plurality of anatomical images, an individual mixed-context image generated for a considered location in the location sequence other than two terminal locations thereof is a multi-channel image comprising the plurality of MRI slices of a corresponding anatomical image imaged at the considered location, a first set of one or more MRI slices imaged at a first location, and a second set of one or more MRI slices imaged at a second location. The first location is immediately before the considered location in the location sequence. The second location is immediately after the considered location in the location sequence. Therefore, the individual mixed-context image contains the corresponding anatomical image to be segmented. Multi-modal context is embedded in the individual mixed-context image through the inclusion of the corresponding anatomical image in its entirety. Furthermore, one or more of the MRI slices in each of the two adjacent anatomical images are selected and introduced into the individual mixed-context image. The two adjacent anatomical images actually reflect variations of real structures among different objects in the corresponding anatomical image. It follows that the 3D spatial context of the image volume is included in the individual mixed-context image. The side information on multi-modal context and 3D spatial context is advantageously utilizable by the 2D CNN for enhancing accuracy in segmenting the corresponding anatomical image without a need to use a more computation-intensive 3D CNN. Since original MRI slices in the adjacent anatomical images are used for forming the individual mixed-context image, advantageously it avoids the individual mixed-context image from including any MRI slice estimated for an intermediate location between the first location and the considered location, or between the second location and the considered location.

Figure 4:
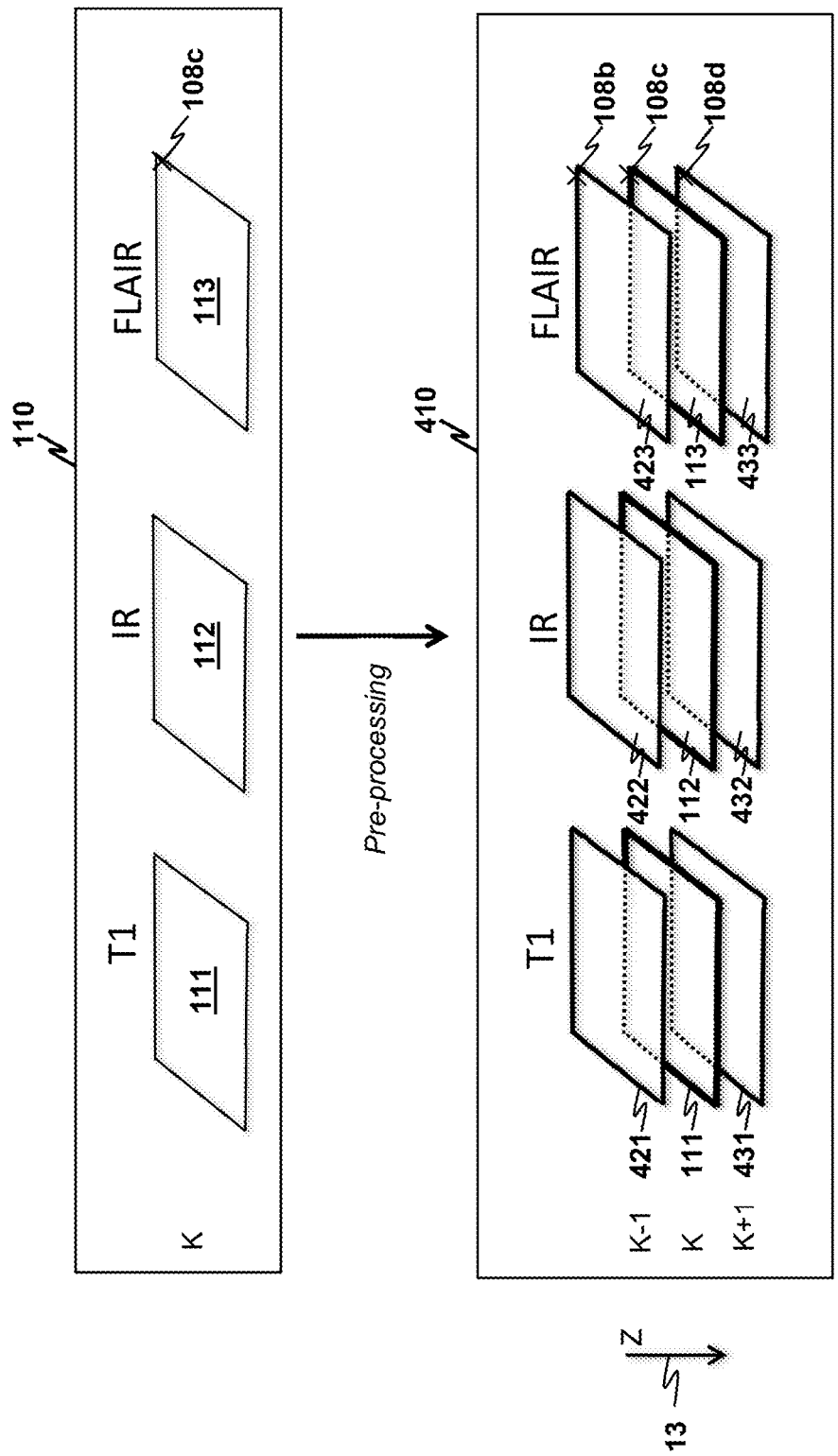
FIG. 4 depicts one example of a mixed-context image for a considered location by including MRI slices of an anatomical image imaged at the considered location, and MRI slices of two adjacent anatomical images.

To illustrate the generation of individual mixed-context image, FIG. 4 depicts an example of generating a mixed-context image 410 for the considered location 108c in the location sequence 107. The considered location 108c is not one of the two terminal locations 108a, 108g. The mixed-context image contains the anatomical image 110, which is imaged at the considered location 108c. The anatomical image 110 includes the first, second and third MRI slices 111, 112, 113 imaged under the T1 MRI modality, IR MRI modality and FLAIR MRI modality, respectively. In the example of FIG. 4, a first adjacent anatomical image 131, imaged at the first location 108b (namely, the location immediately before the considered location 180c in the location sequence 107), and a second adjacent anatomical image 132, imaged at the second location 108d (namely, the location immediately after the considered location 180c in the location sequence 107), are incorporated into the mixed-context image 410. (If the anatomical image 110 is treated as the kth anatomical image in the image volume 100, then the first and second adjacent anatomical images 131, 132 are the (k−1)th and (k+1) anatomical images, respectively.) Equivalently, all the MRI slices 421-423 of the first adjacent anatomical image 131 and all the MRI slices 431-433 of the second adjacent anatomical image 132 are incorporated. That is, the first MRI-slice set consists of the MRI slices 421-423 in the first adjacent anatomical image 131, and the second MRI-slice set consists of the MRI slices 431-433 in the second adjacent anatomical image 132. The number of MRI slices in each of the first and second MRI-slice sets is a total number of MRI slices in the anatomical image 110 such that each of the first and second MRI-slice sets is imaged under the plurality of preselected MRI modalities.

Including all the MRI slices 421-423, 431-433 from the two adjacent anatomical images 131, 132 into the mixed-context image 410 potentially maximizes the segmentation performance. Despite this, the amount of computation involved in running the 2D CNN may be reduced by including only a portion of the MRI slices 421-423, 431-433 with only an insignificant loss in segmentation performance. Preferably, the first and second MRI-slice sets consist of only a first proper subset of the MRI slices 421-423 and a second proper subset of the MRI slices 431-433, respectively, such that the first and second MRI-slice sets are part of the first adjacent anatomical image 131 and part of the second adjacent anatomical image 132, respectively. More preferably, each of the first and second MRI-slice sets has a same number of MRI slices and is imaged under a same set of MRI modalities selected from the plurality of preselected MRI modalities. In this configuration, the presence of three MRI slices obtained under the same MRI modality and imaged at three successive locations 108b, 108c, 108d in the location sequence 107 enables more accurate segmentation of the anatomical image 110 since the anatomical image 110 is located in the middle of the three successive locations. In one implementation option, each of the first and second MRI-slice sets has only one MRI slice imaged under the same MRI modality.

Figure 5:
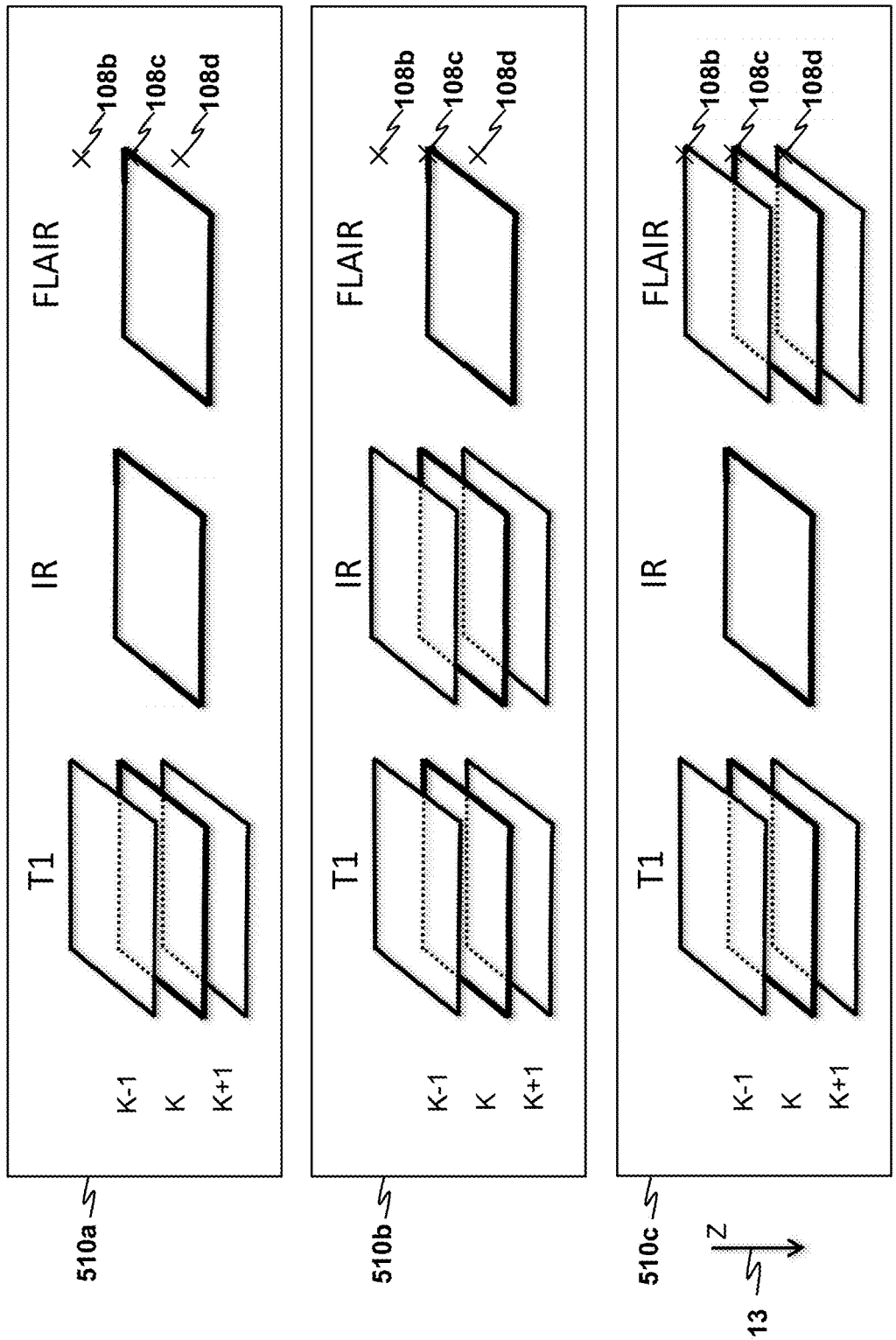
FIG. 5 depicts further examples of the mixed-context image.

In practice, a mixed-context image that includes MRI slices imaged at the three successive locations 108b, 108c, 108d under the T1 MRI modality is preferable because the T1 MRI modality provides high soft tissue discrimination. Incorporating MRI slices imaged under the T1 MRI modality at the first and second locations 108b, 108d enhances the 3D spatial context of the mixed-context image. FIG. 5 depicts some examples of such preferable mixed-context images having different choices of the first and second MRI-slices sets. In addition to the anatomical image 110, a first mixed-context image 510a further includes two MRI slices imaged at the first and second locations 108b, 108d under the T1 MRI modality. A second mixed-context image 510b consists of the three MRI slices 111-113 of the anatomical image 110, a first pair of MRI slices of the first adjacent anatomical image 131 under the T1 and IR MRI modalities, and a second pair of MRI slices of the second adjacent anatomical image 132 also under the T1 and IR MRI modalities. A third mixed-context image 510c consists of the three MRI slices 111-113 of the anatomical image 110, a first pair of MRI slices of the first adjacent anatomical image 131 under the T1 and FLAIR MRI modalities, and a second pair of MRI slices of the second adjacent anatomical image 132 also under the T1 and FLAIR MRI modalities.

For each of anatomical images 133, 134 respectively imaged at the two terminal locations 108a, 108g of the image volume 100, one adjacent anatomical image is missing in forming a corresponding mixed-context image. Without loss of generality, consider generating the corresponding mixed-context image for the anatomical image 133. The absence of one adjacent anatomical image may be remedied by assuming a blank image to be this missing adjacent anatomical image in generating the corresponding mixed-context image. This remedy is practically acceptable because at the location 108a, usually no soft tissue is present and the anatomical image 133 is clinically not of importance. It is also possible that the anatomical image 133 may be assumed to be the missing adjacent anatomical image. This remedy is also practically acceptable since the 2D CNN is usually robust against image noises caused by mismatch.

As a remark, US2018/0240235A1 discloses using a multi-slice FCN to process a target 2D slice and one or more nearest neighbor 2D slices for segmenting the target 2D slice. However, the target 2D slice and the one or more nearest neighbor 2D slices are not multi-channel images. Differently, the preprocessing algorithm disclosed herein for the step 310 creates the individual mixed-context image from the plurality of anatomical images 100 by re-arranging or re-organizing MRI slices in the anatomical image 101 and the two adjacent anatomical images 131, 132.

Refer to FIG. 3. After the plurality of mixed-context images is generated in the step 310, the plurality of mixed-context images is individually processed with the 2D CNN, which has been trained, to generate a segmented image volume in a step 325. In the step 325, the individual mixed-context image is processed by the 2D CNN to segment the corresponding anatomical image, enabling the 2D CNN to utilize the side information to enhance segmentation accuracy. Furthermore, since the individual mixed-context image is free from any estimated MRI slice, it avoids a source of segmentation performance degradation due to artifacts in the estimated MRC slice. The segmentation of the individual mixed-context image with the 2D CNN is repeated for all different mixed-context images in the plurality of mixed-context images until all the mixed-context images are segmented (step 345).

Advantageously and preferably, the 2D CNN is BASKET-NET as disclosed herein. Nonetheless, other types of 2D CNNs may also be adapted to process the individual mixed-context image, e.g., U-NET and its variants as disclosed in CN109087318A, CN108537793A and WO2017091833A1, and in O. RONNEBERGER, P. FISCHER and T. BROX, (2015) "U-Net: Convolutional Networks for Biomedical Image Segmentation," in: Navab N., Hornegger J., Wells W., Frangi A. (eds) Medical Image Computing and Computer-Assisted Intervention—MICCAI 2015, *Lecture Notes in Computer Science*, vol. 9351, Springer, the disclosure of which is incorporated by reference herein.

In performing the step 325, due to CNN implementation consideration, usually the individual mixed-context image is first gridded to form plural multi-channel patches (step 320) and the multi-channel patches are one-by-one processed by the 2D CNN (step 330) until all the patches are processed (step 340). In one embodiment, an individual patch has a size of 80×80 pixels. Although transforming the individual mixed-context image into the patches by gridding is usually used before CNN processing, the present disclosure is not restricted that gridding is required to be used. It is possible that the 2D CNN is implemented to directly process the individual mixed-context image without a need for gridding.

After the segmented image volume is obtained in the step 325, optionally the segmented image volume is post-processed in a step 350. Post-processing includes labeled image volume reconstruction, boundary cutting, etc. After processing the plurality of multi-channel patches with the 2D CNN, all the processed patches are assembled to form a segmented image, which may be larger than the original anatomical image. Boundary cutting is used to reduce the size of the segmented image to that of the original anatomical image. In labeled image volume reconstruction, each pixel in the segmented image is labeled with a number, e.g., 0, 1, 2, to indicate the pixel's class or region that the pixel is classified to.

One important feature of the step 310 is that all the MRI slices in the individual mixed-context image are obtained directly from the image volume 100 without a need to do any interpolation as is usually required when a 3D CNN is used. Computed MRI slices introduce artifacts, which could cause large errors. For demonstrating the robustness of the disclosed method using the step 310 against an existing approach of using the 3D CNN in the presence of large slice gap, experimental results were obtained for segmenting a MRI image volume into gray matter, white matter and cerebrospinal fluid with the slice gap increased from 3 mm to 6 mm. The 3D CNN that was used was realized as VoxResNet. For the disclosed method, BASKET-NET was used as the 2D CNN. The segmentation performance was measured by DCS. Computation of DSC is given by L. R. DICE, "Measures of the amount of ecologic association between species," *Ecology*, 1945; 26:297-302, the disclosure of which is incorporated by reference herein. The following table lists the performance loss, in terms of percentage drop in DCS, when the slice gap was increased from 3 mm to 6 mm. The disclosed method using the step 310 and the approach of using the 3D CNN are considered.

| | Percentage drop in DCS | | |
|---|---|---|---|
| | Gray matter | White matter | Cerebrospinal fluid |
| Disclosed method | 2% | 1% | 2% |
| Using 3D CNN | 13% | 16% | 41% |

The data in the table show that while there is a significant performance drop by using the 3D CNN when the slice gap is increased from 3 mm to 6 mm, the corresponding performance drop for the disclosed method is small. The result demonstrates the robustness of the disclosed method against an increase in slice gap.

Also note that the plurality of mixed-context images is independent of the slice gap 105. The disclosed image-volume segmenting method is useful even if successive body-part locations that are imaged are spaced too far away, or if there is variation of slice gaps among different MRI image volumes to be segmented. Since the preprocessing algorithm as detailed in the step 310 is also used in the training phase 210, a corresponding slice gap used in each labeled image volume in the training dataset is also not taken into consideration by the preprocessing algorithm.

A second aspect of the present disclosure is to provide BASKET-NET, a novel CNN model for realizing the 2D CNN.

Figure 6:
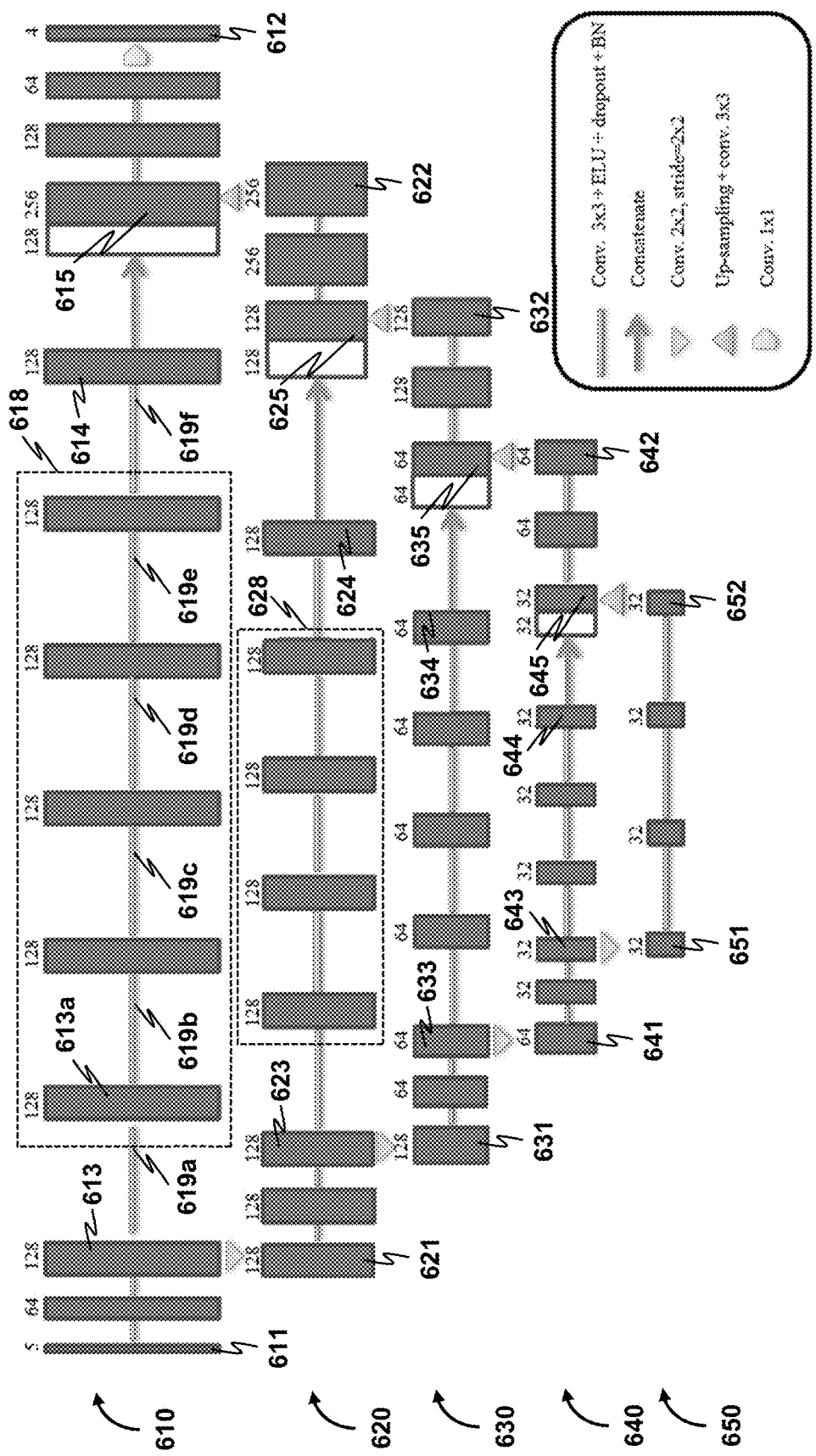
FIG. 6 depicts an exemplary BASKET-NET model for realizing the 2D CNN.

The BASKET-NET model has a network model structure exemplarily illustrated as follows through an example realization shown in FIG. 6. FIG. 6 depicts a realization of the 2D CNN according to a BASKET-NET model 600 adapted to process each of the multi-channel patches obtained from the first mixed-context image 510a shown in FIG. 5. The first mixed-context image 510a is a five-channel image since it has 5 MRI slices.

The 2D CNN realized by the BASKET-NET model 600 is used for generating an output segmentation map 612 from a received input image 611 via generating plural feature maps in between (e.g., a sequence of feature maps 618). Each of the received input image 611, the output segmentation map 612 and the feature maps is a multi-channel map having plural channels.

Similar to the U-NET model disclosed by O. RONNEBERGER, P. FISCHER and T. BROX, the BASKET-NET model 600 is a multi-level model comprising a plurality of levels sequentially arranged from a highest level 610 to a lowest level 650. As an example shown in FIG. 6, the BASKET-NET model 600 has five levels, namely, the highest level 610, three intermediate levels 620, 630, 640 and the lowest level 650. In general, a BASKET-NET model may have any number of levels greater than two, e.g., four and six.

The BASKET-NET model 600, or the plurality of levels 610, 620, 630, 640, 650, is configured to include the following four characteristics.

First, an individual level generates an output map from an input map. The input map of the individual level is transformed into the output map thereof through generating a series of feature maps in between. As shown in FIG. 6, the levels 610, 620, 630, 640, 650, respectively, have the input maps 611, 621, 631, 641, 651 and the output maps 612, 622, 632, 642, 652. Consider the level 620 for illustration. The input map 621 is transformed into the output map 622 with generation of a series of feature maps in between. The series of feature maps includes feature maps 623, 624, 628.

Second, the input map and the output map of the highest level 610 are also the received input image 611 and the output segmentation map 612, respectively.

Third, for a next lower level immediately lower than the individual level, the input map of the next lower level is obtained by downsampling a first preselected feature map of the individual level. For example, the next lower level immediately lower than the level 620 is the level 630. By downsampling, the 2D image size of each channel in the first preselected feature map is reduced. The number of channels remains unchanged in the downsampling so that the first preselected feature map of the individual level and the input map of the next lower level have the same number of channels. The levels 610, 620, 630, 640, respectively, have the first preselected feature maps 613, 623, 633, 643. Note that the lowest level 650 does not have a first preselected feature map. The first preselected feature maps 613, 623, 633, 643 of respective levels 610, 620, 630, 640 are downsampled to form the input maps 621, 631, 641, 651 of respective next lower levels 620, 630, 640, 650. In certain embodiments, the downsampling is achieved by using a convolutional layer or a pooling layer with a stride of 2. "A stride" is the number of pixels that the filter jumps from one position to an immediately next position.

Fourth, the output map of the next lower level is upsampled and then concatenated with a second preselected feature map of the individual level to generate a next feature map next to the second preselected feature map in the individual level. By upsampling, the 2D image size of each channel in the output map of the next lower level is increased to form an upsampled output map. The number of channels remains unchanged in the upsampling, so that the output map and the upsampled output map have the same number of channels. The second preselected feature map is concatenated with the upsampled output map by appending the second preselected feature map with the channels of the upsampled output map to form the next feature map. The levels 610, 620, 630, 640, respectively, have the second preselected feature maps 614, 624, 634, 644 and the next feature maps 615, 625, 635, 645. Note that the lowest level 650 does not have a second preselected feature map. The output maps 652, 642, 632, 622, respectively, of respective levels 650, 640, 630, 620 are upsampled and then concatenated with the second preselected feature maps 644, 634, 624, 614 of respective levels 640, 630, 620, 610, thereby respectively forming the next feature maps 645, 635, 625, 615 of the respective levels 640, 630, 620, 610.

The Inventors make the following observation that leads to a distinctive feature of the BASKET-NET model 600. The 2D CNN is used to segment an anatomical image, or a mixed-context image, by feature classification. In the highest level 610, the feature maps, e.g., the sequence of successive feature maps 618, are intended to extract or identify low-level features. Low-level features are fine details of an image that can be extracted by a convolutional filter, such as lines, edges or dots. High-level features are built on top of low-level features to detect objects and larger shapes in the image. Hence, the feature maps in the lowest level 650 are intended to extract or identify high-level features. It follows that low-level features are gradually transformed into high-level features from the highest level 610 to the lowest level 650. In segmenting the anatomical image or the mixed context image, a goal is to identify fine details in the image since fine details are more valuable to medical diagnosis performed by a medical practitioner than large details. If a first feature map has more channels than a second feature map, the first feature map has more storage capacity for containing features than the second feature map. As such, it is advantageous if a higher level has more channels in most feature maps (more preferably in each feature map) than a lower level does. The Inventors observe that differently, the U-NET has more channels in feature maps of a lower level than in feature maps of a higher level.

Advantageously, the BASKET-NET model 600 is further configured as follows. A first number of channels in the second preselected feature map of the individual level is greater than or equal to a second number of channels in the second preselected feature map of the next lower level. As a result, more feature details are containable in the individual level than in the next lower level, thereby allowing the second preselected feature map of the highest level to be rich in low-level feature details for assisting finer segmentation of the received input image 611 in generating the output segmentation map 612.

In the above discussion, the number of channels in the second preselected feature map of a level under consideration is selected to represent the number of channels employed in most of feature maps in the level. Alternatively, the number of channels in most of feature maps in the level may be represented by a minimum number of channels among feature maps between the first and second preselected feature maps inclusively. If the latter representation is used, the BASKET-NET model 600 is configured such that a first minimum number of channels in feature maps between the first and second preselected feature maps, inclusively, of the individual level is greater than or equal to a second minimum number of channels among feature maps between the first and second preselected feature maps, inclusively, of the next lower level.

In FIG. 6, the number of channels of each map is shown on top of the map. It is shown that the number of channels in most feature maps of the highest level 610 is 128. In particular, it is shown that there are 128 channels for feature maps between the first and second preselected feature maps 613, 614, inclusively. In the levels 620, 630, 640, 650, the corresponding numbers of channels in most feature maps are 128, 64, 32 and 32, respectively. It is apparent that the number of channels in most feature maps decreases monotonically from the highest level 610 to the lowest level 650. It is also apparent that for the levels 610, 620, 630, 640, respectively, the numbers of channels in the second preselected feature maps 614, 624, 634, 644 are 128, 128, 64 and 32.

Also note that as shown in FIG. 6, the received input image 611 has 5 channels and the output segmentation map 612 has 4 channels. It is because the BASKET-NET model 600 shown in FIG. 6 is adapted to process the first mixed-context image 510*a* having 5 MRI slices as the received input image 611. The first mixed-context image 510a is segmented into 4 classes, namely, background, gray matter, white matter and cerebrospinal fluid.

In the individual level, preferably an individual feature map other than the second preselected feature map is processed with one or more hidden layers to generate a subsequent feature map, where the one or more hidden layers include a convolutional layer. In certain embodiments, the one or more hidden layers consist of the convolutional layer, an ELU layer, a dropout layer and a BN layer. For example, in the highest level 610, a subsequent feature map 613a is generated from the first preselected feature map 613 by processing with a sequence of hidden layers 619a consisting of a convolutional layer, an ELU layer, a dropout layer and a BN layer. ELU is an activation function. Details of ELU can be found in C. NWANKPA, W. IJOMAH, A. GACHAGAN and S. MARSHALL, "Activation Functions: Comparison of trends in Practice and Research for Deep Learning," arXiv:1811.03378, the disclosure of which is incorporated by reference herein. Details of the dropout layer can be found in N. SRIVASTAVA, G. HINTON, A. KRIZHEVSKY, I. SUTSKEVER and R. SALAKHUTDINOV, "Dropout: A Simple Way to Prevent Neural Networks from Overfitting," 15(June):1929-1958, 2014, the disclosure of which is incorporated by reference herein. Details of the BN layer can be found in S. IOFFE and C. SZEGEDY, "Batch Normalization: Accelerating Deep Network Training by Reducing Internal Covariate Shift," arXiv:1502.03167, the disclosure of which is incorporated by reference herein.

In the individual level, preferably one or more hidden layers are used to generate the second preselected feature map from the first preselected feature map. For example, in the highest level 610, the second preselected feature map 614 is generated from the first preselected feature map 613 through plural sequences of hidden layers 619a-f.

In implementing the BASKET-NET model 600 as the 2D CNN for the image-volume segmenting method, the received input image 611 is a part of the individual mixed-context image and the output segmentation map 612 is a part of the segmented corresponding anatomical image corresponding to the part of the mixed-context image. If the 2D CNN is implemented to directly process the individual mixed-context image without gridding, the received input image 611 is the individual mixed-context image and the output segmentation map 612 is the segmented corresponding anatomical image.

The achieved segmentation performance of the disclosed method that utilizes mixed-context images and the BASKET-NET model 600 is compared with the performance of segmenting image volumes based on using ordinary anatomical images and the U-NET model. Multi-modal MRI data provided by MRBrainS18 (Grand Challenge on MR Brain Segmentation at MICCAI 2018) were used for image volume segmentation in the test. The multi-modal MRI data were obtained under T1-weighted, T1-weighted inversion recovery and T2-FLAIR MRI modalities (respectively corresponding to T1, IR and FLAIR MRI modalities used herein). In testing the disclosed method, the format of each mixed-context image followed that of the first mixed-context image 510a as shown in FIG. 5. Mean values of DSC, which are used as indicators of segmentation performance, were obtained. The obtained mean DSC values are shown in the table below.

| Method, based on | Mean DSC value |
|---|---|
| Mixed-context images and BASKET-NET | 0.8657 |
| Ordinary anatomical images and U-NET | 0.8507 |

The results indicate that the disclosed method of using mixed-context images and the BASKET-NET model achieves a better segmentation performance than an earlier method of using ordinary anatomical images and the U-NET model.

Although it is preferable that the 2D CNN realized by the BASKET-NET model 600 is used for processing the plurality of mixed-context images, it is still advantageous to use a BASKET-NET model as a 2D CNN to directly process the plurality of anatomical images 100 by utilizing the advantage of assisting finer segmentation of the received input image in generating the output segmentation map. Then the received input image 611 is a part of the individual anatomical image (e.g., the anatomical image 110) and the output segmentation map 612 is a corresponding part of the segmented anatomical image. If the 2D CNN is implemented to directly process the individual anatomical image without gridding, the received input image 611 is the individual anatomical image and the output segmentation map 612 is the segmented anatomical image.

A third aspect of the present disclosure is to provide a technique of gridding the individual mixed-context image or an individual anatomical image for further improving the performance of segmenting the image volume 100. The technique is applicable to the disclosed image-volume segmenting method with or without the preprocessing step 310. The technique is based on selecting multiple grids, using each grid as a candidate grid to grid the input image to form a respective plurality of patches, segmenting the respective plurality of patches by the 2D CNN to generate a candidate segmented image, and forming the output segmented image from the generated plurality of candidate segmented images by pixel-wise majority voting.

Figure 7:
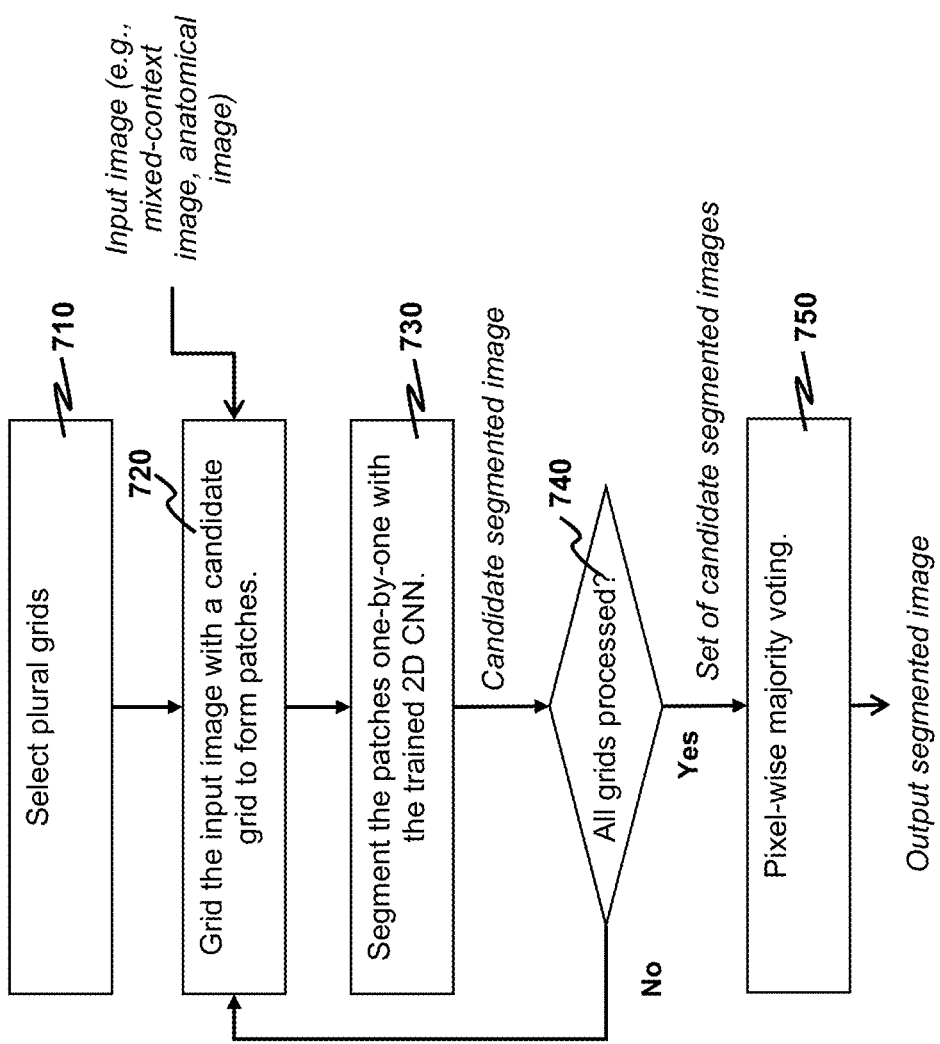
FIG. 7 depicts a flowchart for exemplarily illustrating a method for obtaining an output segmented image from an input image, where a plurality of grids is individually used to grid the input image.

The technique is described in more detail with the aid of FIG. 7. FIG. 7 depicts a flowchart for exemplarily illustrating a method for obtaining an output segmented image from an input image, where the aforementioned gridding technique is used. The input image may be the individual mixed-context image or the individual anatomical image. The individual mixed-context image used as the input image gives the segmented corresponding anatomical image as the output segmented image. If the individual anatomical image is the input image, the output segmented image is simply the individual anatomical image after segmentation by an appropriate 2D CNN.

In a step 710, plural grids each used for gridding the input image are selected, wherein the grids are geometrically offset from each other. Selection of the grids is exemplarily illustrated with the aid of FIG. 8.

Figure 8:
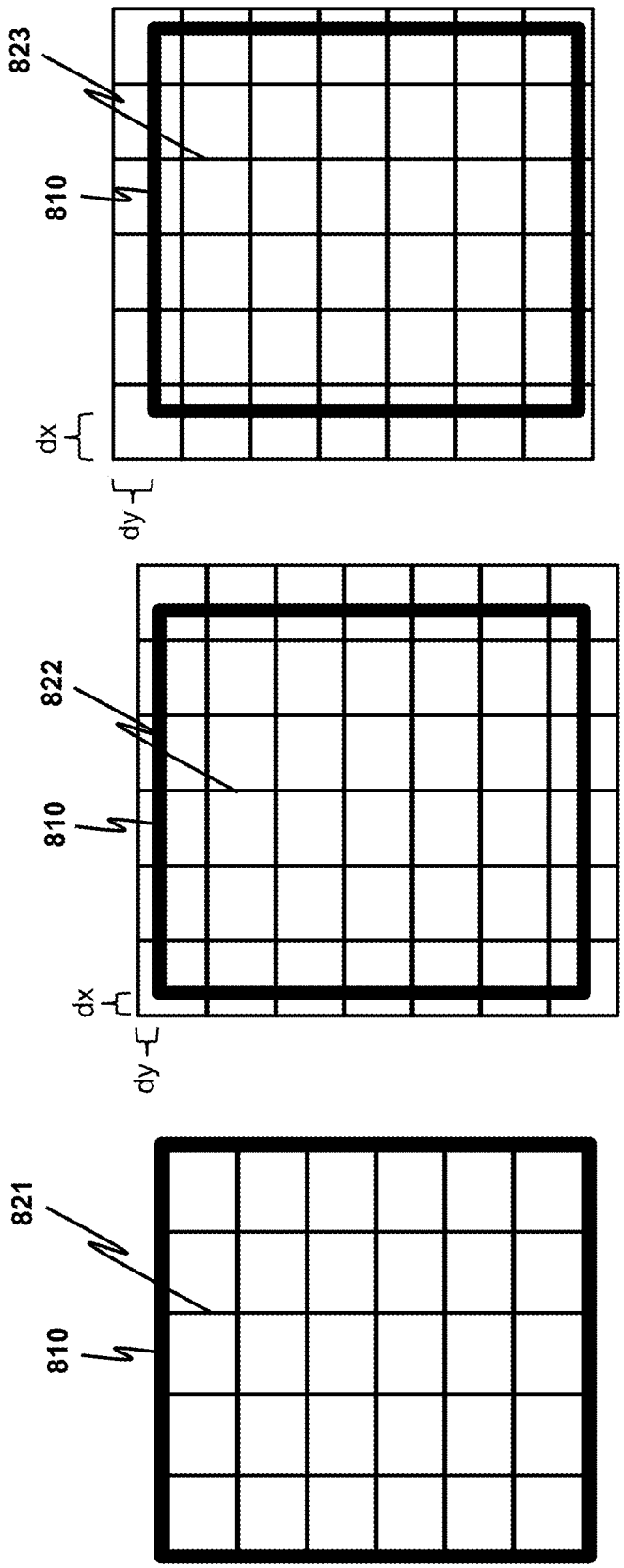
FIG. 8 depicts an example of three grids each used for gridding the input image to form a plurality of patches.

FIG. 8 depicts an example of three grids (first grid 821, second grid 822 and third grid 823) used as candidate grids for gridding the input image 810. The first grid 821 is a conventional grid for patch generation, covering the entire input image 810. Gridding the input image 810 with the first grid 821 results in a first plurality of patches. The second grid 822 is formed by shifting the first grid 821 along a direction opposite to the x-axis 11 by dx and along a direction opposite to the y-axis 12 by dy, where dx and dy are distances measured in number of pixels. The third grid 823 is formed in a similar way but (dx, dy), an ordered pair of values of dx and dy, used in forming the third grid 823 is not identical to (dx, dy) used in forming the second grid 822. It follows that the second and third grids 822, 823 are geometrically offset from the first grid 821. Similarly, the second and third grids 822, 823 are mutually offset from each other. Note that in the special case of the conventional grid, i.e. the first grid 821, (dx, dy)=(0, 0) is used.

In one example, consider that a resultant patch after gridding has a size of 80×80 pixels. The second grid 822 and the third grid 823 are generated from the first grid 821 with (dx, dy)=(16, 16) and (dx, dy)=(48, 48), respectively. In this example, dx and dy for the second grid 822 are each selected to be 20% of 80, a length of the patch. For the third grid 823, the corresponding percentage is 60%.

After the grids are selected in the step 710, a candidate grid is selected from the grids. In a step 720, the input image is gridded according to the candidate grid to form plural patches. Since the input image is a multi-channel image, an individual patch obtained in the step 720 is a multi-channel patch. Refer to FIG. 8. It is observed that the second and third grids 822, 823 are larger than the input image 810. In a general case, if a candidate grid is larger than an input image, areas of patches not covering the input image during generation of the patches are zero-padded. After the patches are obtained, each of the patches is processed by the 2D CNN in a step 730 so as to obtain a candidate segmented image. The steps 720, 730 are repeated for all the grids (step 740). It follows that a plurality of candidate segmented images is obtained.

In a step 750, the output segmented image is formed from the plurality of candidate segmented images according to pixel-wise majority voting, as elaborated as follows. Each candidate segmented image, formed based on a respective grid for patch generation, is first geometrically shifted with an amount of shift same as that introduced in forming the respective grid from the conventional grid. Consider the second grid 822 shown in FIG. 8 for illustration. The upper leftmost corner of the input image 810 is offset from the upper leftmost corner of the second grid 822 by dx along the x-axis 11 and dy along the y-axis 12, where (dx, dy)=(16, 16). After segmentation, the candidate segmented image obtained due to the second grid 822 is also geometrically offset from the second grid 822 by dx and dy along the x-axis 11 and the y-axis 12, respectively. To bring the upper leftmost corner of the candidate segmented image to the upper leftmost corner of the second grid 822, the candidate segmented image is shifted by −dx and −dy along the x-axis 11 and the y-axis 12, respectively. After all the candidate segmented images are shifted, it forms a plurality of geometrically-aligned candidate segmented images. An individual pixel in each of such images has a value that indicates the class or region that the individual pixel is classified to. The class of pixel on certain (x, y) coordinate in the output segmented image is determined by majority voting of the classes of pixels on the same (x, y) coordinate in the plurality of geometrically-aligned candidate segmented images. For the three-grid case as shown in FIG. 8, if the classes of three pixels at a certain (x, y) coordinate among all three geometrically-aligned candidate segmented images are white matter, white matter and gray matter, respectively, the corresponding pixel at this (x, y) coordinate in the output segmented map is allocated to the class of white matter.

The above-mentioned technique of using multiple grids and then forming the output segmented image via pixel-wise majority voting is applied to the inference phase 220 only in order to gain improvement in the segmentation performance. This technique is not applied to the training phase 210 and the retraining phase 230.

A test was done for confirming the performance improvement made by the aforementioned technique of using multiple grids. The disclosed method of using mixed-context images and the BASKET-NET model was employed in the test. Multi-modal MRI data provided by *MRBrainS*18 (Grand Challenge on MR Brain Segmentation at MICCAI 2018) were used for image volume segmentation in the test. Values of DSC for segmenting image volumes into white matter, gray matter and cerebrospinal fluid are listed in the following table under two test conditions of using a single grid for gridding and using multiple grids.

|  | DSC for cerebrospinal fluid | DSC for gray matter | DSC for white matter |
| --- | --- | --- | --- |
| Single grid | 0.847 | 0.848 | 0.889 |
| Multiple grids | 0.852 | 0.850 | 0.890 |

The results demonstrate that the disclosed technique of using multiple grids achieves a better segmentation performance than the conventional technique of using a single grid in generating a plurality of patches for CNN processing.

A fourth aspect of the present disclosure is to provide a method for retraining the 2D CNN. The 2D CNN is used in a computer-executed inference process, where the inference process is used for segmenting the image volume and is arranged according to any of the embodiments of the image-volume segmenting method as disclosed herein. As mentioned above, the 2D CNN is characterized by a network model structure and a set of CNN model weights applied to the network model structure. Retraining the 2D CNN is to search for a better set of CNN model weights for improving the segmentation performance.

Figure 9:
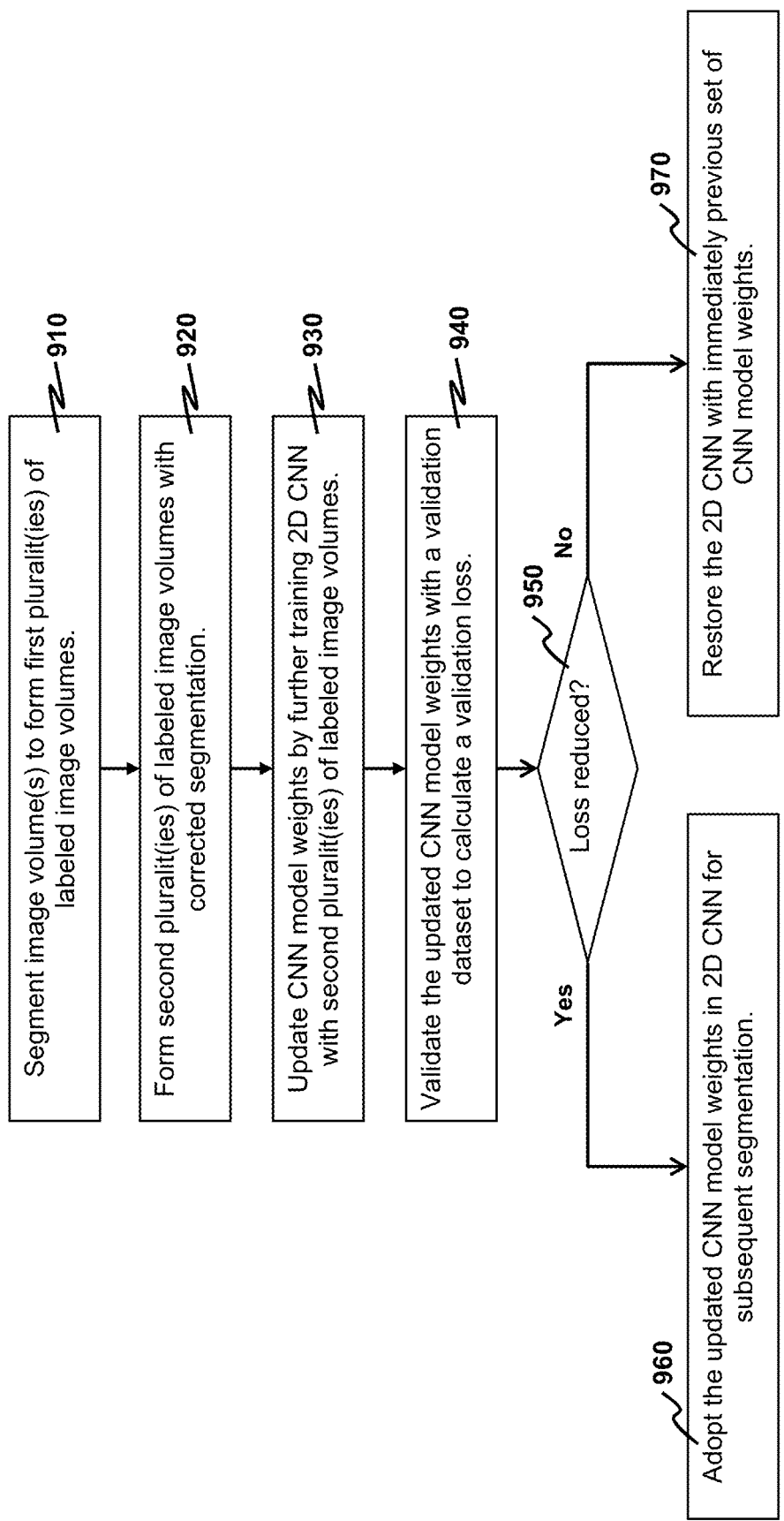
FIG. 9 depicts a flowchart showing exemplary steps used in retraining the 2D CNN in accordance with certain embodiments of the present disclosure.
Figure 10:
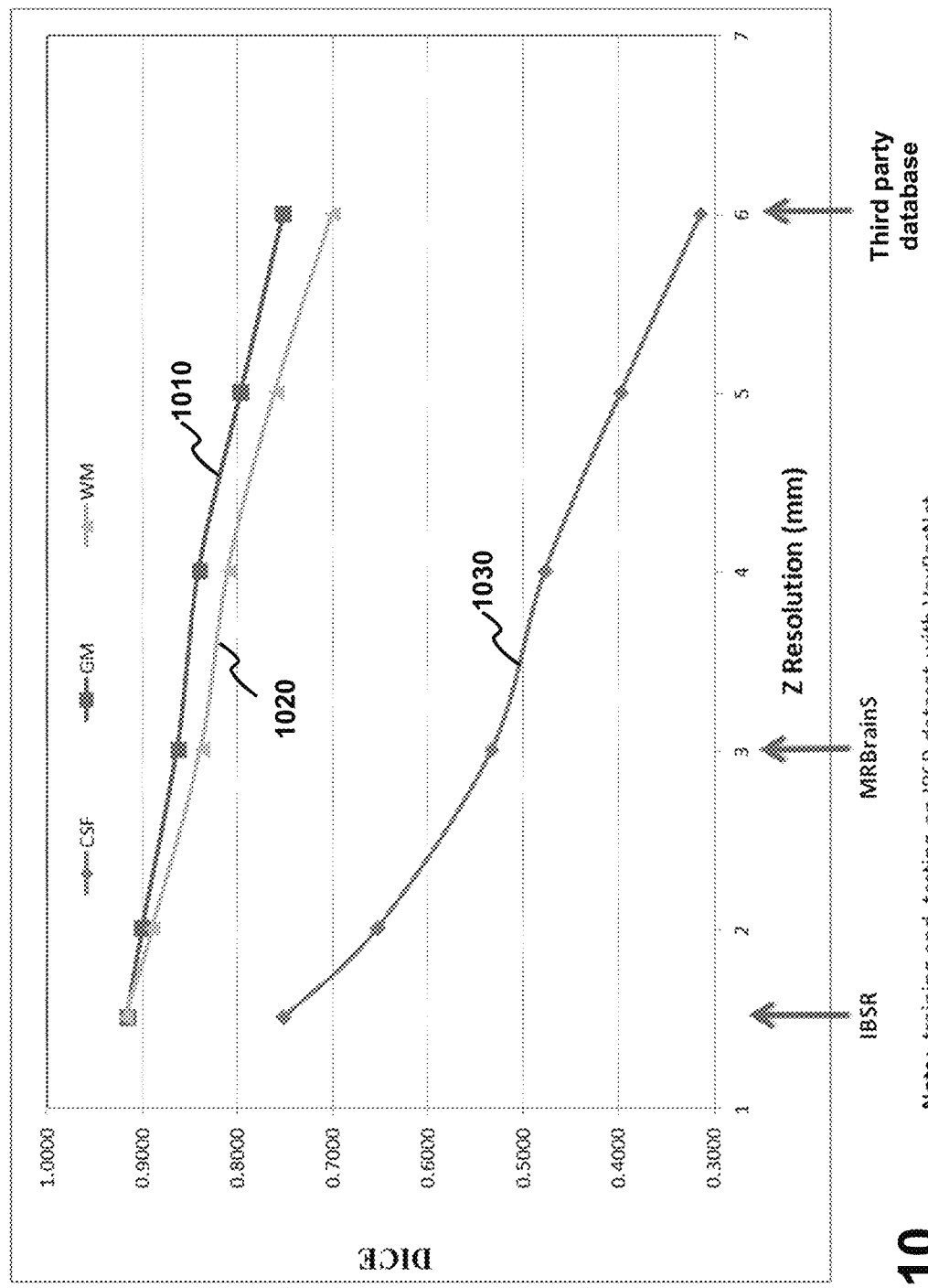
FIG. 10 plots segmentation performance curves in terms of DSC versus different slice gaps in segmenting an image volume of a brain into gray matter, white matter and cerebrospinal fluid by using a 3D CNN, indicating that a significant performance drop is experienced when the slice gap in increased.

FIG. 9 depicts a flowchart showing exemplary steps of the 2D CNN retraining method.

In a step 910, the inference process is executed one or more times for segmenting one or more respective image volumes to create one or more first pluralities of labeled anatomical images. Each image volume is segmented and results in one plurality of labeled anatomical images. An individual labeled anatomical image is created from a corresponding anatomical image after segmentation. Different classes are labeled or indicated on the individual labeled anatomical image. Equivalently, each labeled anatomical image may also be formed as an original anatomical image with labels in separate documents for locating different classes identified on the original anatomical image.

After the one or more first pluralities of labeled anatomical images are obtained in the step 910, one or more second pluralities of labeled anatomical images are generated from the one or more first pluralities of labeled anatomical images in a step 920. In particular, each second plurality of labeled anatomical images is generated from a corresponding first plurality of labeled anatomical images. In an individual first plurality of labeled anatomical images, one or more labeled anatomical images are replaced with a same number of one or more relabeled anatomical images having corrected segmentation over corresponding one or more labeled anatomical images, so that as a whole, the individual first plurality of labeled anatomical images is replaced by a second plurality of labeled anatomical images. As a result, one or more respective second pluralities of labeled anatomical images are generated from the one or more first pluralities of labeled anatomical images.

In preparing the one or more relabeled anatomical images, all labeled anatomical images in the individual first plurality of labeled anatomical images are first scored. The score of a labeled anatomical image indicates the degree of confidence that the labeled anatomical image is correctly segmented. Since segmentation results include segmentation labels and scores for individual pixels, the mean score computed over the pixels may be used as the score of the labeled anatomical image. The one or more low-score labeled anatomical images are manually corrected by, e.g., a medical professional, to form the one or more relabeled anatomical images.

Also note that the individual first plurality of labeled anatomical images has at least one image incorrectly segmented. In practice, a large number of image volumes are segmented. Each of the segmented image volumes is scored. After all the segmented image volumes are scored and checked, the one or more first pluralities of labeled anatomical images requiring segmentation correction are identified, or else all the segmented image volumes are found to be correctly segmented.

Note that in performing the step 910, the 2D CNN has already been trained. The main advantage of the disclosed retraining method is that the CNN model weights are updated from a previous set of CNN model weights already used in the inference phase 220. Retraining the 2D CNN potentially reduces the amount of computation effort/time required in comparison to a traditional approach of redoing the training (of the training phase 210) to determine a completely new set of CNN model weights. Furthermore, manually rebuilding the training dataset as required by the traditional approach is not necessary in the disclosed retraining method.

After the step 920 is performed, the 2D CNN is further trained with the one or more respective second pluralities of labeled anatomical images to update the set of CNN model weights from an immediately previous set of CNN model weights (step 930). Thereby, an updated set of CNN model weights is obtained.

In a step 940, the updated set of CNN model weights is validated by repeating the inference process for segmenting a plurality of test image volumes of a validation dataset under a condition that the 2D CNN employs the updated set of CNN model weights. Based on segmenting the plurality of test image volumes and evaluating segmentation accuracy in each segmentation, a validation loss that is obtained by using the updated set of CNN model weights in the 2D CNN is computed. The validation loss indicates a degree of overall segmentation loss in segmenting the plurality of test image volumes of the validation dataset. For example, the validation loss may be computed as 1 minus the mean DSC computed for the segmentation of the plurality of test image volumes.

In a step 950, the validation loss obtained by the updated set of CNN model (hereinafter referred to as first loss) is compared with a corresponding validation loss obtained by the immediately previous set of CNN weights (hereinafter referred to as second loss). If it is found that the first loss is less than the second loss, then the updated set of CNN model weights is adopted by the 2D CNN to be used in subsequent execution of the inference process (step 960). If, on the other hand, the first loss is not less than the second loss, then the 2D CNN is restored with the immediately previous set of CNN model weights (step 970).

Note that the step 910 is in the inference phase 220 while the steps 920, 930, 940, 950, 960 and 970 are in the retraining phase 230.

The embodiments disclosed herein may be implemented using computing devices, such as computers, computing servers, general purpose processors, specialized computing processors, digital signal processors, processors specialized in computing convolution products or correlations for images, programmable logic devices and field programmable gate arrays, where the computing devices are configured or programmed according to the teachings of the present disclosure. Computer instructions or software codes running in the computing devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for segmenting an image volume formed by a plurality of anatomical images imaged at a sequence of successive locations of a body part, an individual anatomical image being a multi-channel image comprising a plurality of image slices imaged at a same location under a plurality of preselected imaging modalities, the method comprising:

generating a plurality of mixed-context images from the plurality of anatomical images, wherein an individual mixed-context image generated for a considered location in the location sequence other than two terminal locations thereof is a multi-channel image comprising the plurality of image slices of a corresponding anatomical image imaged at the considered location, a first set of one or more image slices imaged at a first location, and a second set of one or more image slices imaged at a second location, and wherein the first and second locations are immediately before and immediately after the considered location in the location sequence, respectively, avoiding the individual mixed-context image from including any imaging slice estimated for an intermediate location between the first and considered locations or between the second and considered locations; and processing the plurality of mixed-context images individually with a two-dimensional (2D) convolutional neural network (CNN) after the 2D CNN is trained, wherein the individual mixed-context image is processed by the 2D CNN to segment the corresponding anatomical image, enabling the 2D CNN to utilize side information on multi-modal context and three-dimensional (3D) spatial context of the image volume for enhancing accuracy in segmenting the corresponding anatomical image while avoiding a source of segmentation performance degradation due to artifacts in the estimated image slice.

2. The method of claim 1, wherein the first image-slice set is the plurality of image slices in a first adjacent anatomical image imaged at the first location, and the second image-slice set is the plurality of image slices in a second adjacent anatomical image imaged at the second location.

3. The method of claim 1, wherein the first image-slice set is a first proper subset of the plurality of image slices in a first adjacent anatomical image imaged at the first location, and the second image-slice set is a second proper subset of the plurality of image slices in a second adjacent anatomical image imaged at the second location.

4. The method of claim 3, wherein each of the first and second image-slice sets has a same number of image slices and is imaged under a same set of imaging modalities selected from the plurality of preselected imaging modalities.

5. The method of claim 4, wherein said same number of image slices is one.

6. The method of claim 1, wherein:
the body part is a head of a subject; and
the corresponding anatomical image is segmented into a plurality of classes, the plurality of classes consisting of background, gray matter, white matter and cerebrospinal fluid.

7. The method of claim 1, wherein the plurality of preselected imaging modalities consists of magnetic resonance imaging (MRI) modalities including T1 MRI modality, inversion recovery (IR) MRI modality and fluid-attenuated inversion recovery (FLAIR) MRI modality.

8. The method of claim 1, wherein:
the 2D CNN is used for generating an output segmentation map from a received input image via generating plural feature maps in between, wherein each of the received input image, the output segmentation map and the feature maps is a multi-channel map having plural channels;
the received input image is a part of the individual mixed-context image, whereby the output segmentation map is a part of the segmented corresponding anatomical image corresponding to the part of the mixed-context image;
the 2D CNN comprises a plurality of levels sequentially arranged from a highest level to a lowest level, the 2D CNN being configured such that:
an individual level generates an output map from an input map, the input map of the individual level being transformed into the output map thereof through generating a series of feature maps in between;
the input map of the highest level is the received input image and the output map of the highest level is the output segmentation map;
for a next lower level immediately lower than the individual level, the input map of the next lower level is obtained by downsampling a first preselected feature map of the individual level; and
the output map of the next lower level is upsampled and then concatenated with a second preselected feature map of the individual level to generate a next feature map next to the second preselected feature map in the individual level;
and
a first number of channels in the second preselected feature map of the individual level is greater than or equal to a second number of channels in the second preselected feature map of the next lower level such that more feature details are containable in the individual level than in the next lower level, thereby allowing the second preselected feature map of the highest level to be rich in low-level feature details for assisting finer segmentation of the received input image in generating the output segmentation map.

9. The method of claim 8, wherein the 2D CNN is further configured such that in the individual level, an individual feature map other than the second preselected feature map is processed with one or more hidden layers to generate a subsequent feature map, the one or more hidden layers including a convolutional layer.

10. The method of claim 9, wherein the one or more hidden layers consist of the convolutional layer, an exponential linear unit (ELU) layer, a dropout layer and a batch normalization (BN) layer.

11. The method of claim 8, wherein the 2D CNN is further configured such that in the individual level, one or more hidden layers are used to generate the second preselected feature map from the first preselected feature map.

12. The method of claim 8, wherein:
the processing of the plurality of mixed-context images individually with the 2D CNN after the 2D CNN is trained includes processing the individual mixed-context image with the 2D CNN for segmenting the corresponding anatomical image; and
the processing of the individual mixed-context image with the 2D CNN comprises:
gridding the individual mixed-context image to form plural multi-channel patches; and
processing each of the multi-channel patches as the received input image by the 2D CNN so as to obtain the segmented corresponding anatomical image.

13. The method of claim 8, wherein:
the processing of the plurality of mixed-context images individually with the 2D CNN after the 2D CNN is trained includes processing the individual mixed-context image with the 2D CNN for segmenting the corresponding anatomical image; and
the processing of the individual mixed-context image with the 2D CNN comprises:
selecting plural grids each used for gridding the individual mixed-context image, wherein the grids are geometrically offset from each other;
for a candidate grid selected from the grids, gridding the individual mixed-context image according to the candidate grid to form plural multi-channel patches;
processing each of the multi-channel patches as the received input image by the 2D CNN so as to obtain a candidate segmented image for the corresponding anatomical image;
repeating the gridding of the individual mixed-context image and the processing of each of the multi-channel patches for all the grids, whereby a plurality of candidate segmented images is obtained; and
forming the segmented corresponding anatomical image from the plurality of candidate segmented images according to pixel-wise majority voting.

14. A computer-implemented method for retraining a two-dimensional (2D) convolutional neural network (CNN) used in a computer-executed inference process, the 2D CNN having a set of CNN model weights, the inference process being used for segmenting an image volume formed by a plurality of anatomical images imaged at a sequence of successive locations of a body part, an individual anatomical image being a multi-channel image comprising a plurality of image slices imaged at a same location under a plurality of preselected imaging modalities, the method comprising:
executing the inference process one or more times for segmenting one or more respective image volumes to create one or more first pluralities of labeled anatomical images, wherein the inference process is arranged as set forth in the method of claim 1, and wherein an individual labeled anatomical image is created from the corresponding anatomical image after segmentation for identifying different classes in the corresponding anatomical image;
in an individual first plurality of labeled anatomical images, replacing one or more labeled anatomical images with a same number of one or more relabeled anatomical images having corrected segmentation over corresponding one or more labeled anatomical images, so that the individual first plurality of labeled anatomical images is replaced by a second plurality of labeled anatomical images, whereby one or more respective second pluralities of labeled anatomical images are generated from the one or more first pluralities of labeled anatomical images;

further training the 2D CNN with the one or more respective second pluralities of labeled anatomical images to update the set of CNN model weights from an immediately previous set of CNN model weights;

validating the updated set of CNN model weights by repeating the inference process for segmenting a plurality of test image volumes of a validation dataset under a condition that the 2D CNN employs the updated set of CNN model weights, whereby a validation loss that is obtained by using the updated set of CNN model weights in the 2D CNN is computed, the validation loss indicating a degree of overall segmentation loss in segmenting the plurality of test image volumes of the validation dataset; and responsive to finding that the validation loss obtained by the updated set of CNN model is less than a corresponding validation loss obtained by the immediately previous set of CNN weights, adopting the updated set of CNN model weights to be used for the inference process, otherwise restoring the 2D CNN with the immediately previous set of CNN model weights.

15. A computer-implemented method for segmenting an image volume formed by a plurality of anatomical images imaged at a sequence of successive locations of a body part, an individual anatomical image being a multi-channel image comprising a plurality of image slices imaged at a same location under a plurality of preselected imaging modalities, the method comprising:

segmenting an individual anatomical image with a two-dimensional (2D) convolutional neural network (CNN) to form a segmented individual anatomical image after the 2D CNN is trained; and repeating the segmenting of the individual anatomical image with the 2D CNN for all different anatomical images in the plurality of anatomical images, whereby the image volume is segmented;

wherein:

the 2D CNN is used for generating an output segmentation map from a received input image via generating plural feature maps in between, wherein each of the received input image, the output segmentation map and the feature maps is a multi-channel map having plural channels;

the received input image is a part of the individual anatomical image, whereby the output segmentation map is a part of the segmented individual anatomical image corresponding to the part of the individual anatomical image;

the 2D CNN comprises a plurality of levels sequentially arranged from a highest level to a lowest level, the 2D CNN being configured such that:

an individual level generates an output map from an input map, the input map of the individual level being transformed into the output map thereof through generating a series of feature maps in between;

the input map of the highest level is the received input image and the output map of the highest level is the output segmentation map;

for a next lower level immediately lower than the individual level, the input map of the next lower level is obtained by downsampling a first preselected feature map of the individual level; and the output map of the next lower level is upsampled and then concatenated with a second preselected feature map of the individual level to generate a next feature map next to the second preselected feature map in the individual level;

and a first number of channels in the second preselected feature map of the individual level is greater than or equal to a second number of channels in the second preselected feature map of the next lower level such that more feature details are containable in the individual level than in the next lower level, thereby allowing the second preselected feature map of the highest level to be rich in low-level feature details for assisting finer segmentation of the received input image in generating the output segmentation map.

16. The method of claim 15, wherein the 2D CNN is further configured such that in the individual level, an individual feature map other than the second preselected feature map is processed with one or more hidden layers to generate a subsequent feature map, the one or more hidden layers including a convolutional layer.

17. The method of claim 16, wherein the one or more hidden layers consist of the convolutional layer, an exponential linear unit (ELU) layer, a dropout layer and a batch normalization (BN) layer.

18. The method of claim 15, wherein the 2D CNN is further configured such that in the individual level, one or more hidden layers are used to generate the second preselected feature map from the first preselected feature map.

19. The method of claim 15, wherein the segmenting of the individual anatomical image with the 2D CNN comprises:

gridding the individual anatomical image to form plural multi-channel patches; and processing each of the multi-channel patches as the received input image by the 2D CNN so as to obtain the segmented individual anatomical image.

20. The method of claim 15, wherein the segmenting of the individual anatomical image with the 2D CNN comprises:

selecting plural grids each used for gridding the individual anatomical image, wherein the grids are geometrically offset from each other;

for a candidate grid selected from the grids, gridding the individual anatomical image according to the candidate grid to form plural multi-channel patches;

processing each of the multi-channel patches as the received input image by the 2D CNN so as to obtain a candidate segmented image for the individual anatomical image;

repeating the gridding of the individual anatomical image and the processing of each of the multi-channel patches for all the grids, whereby a plurality of candidate segmented images is obtained; and forming the segmented individual anatomical image from the plurality of candidate segmented images according to pixel-wise majority voting.

* * * * *